United States Patent [19]

Fujimori et al.

[11] Patent Number: 5,754,687
[45] Date of Patent: May 19, 1998

[54] INFORMATION RECORDING MEDIUM AND INFORMATION REPRODUCING APPARATUS CAPABLE OF STABLY REPRODUCING CHANGEABLE CODE PATTERNS AT HIGH SPEED

[75] Inventors: Hiroyoshi Fujimori, Hachioji; Yutaka Yunoki, Kunitachi; Shinichi Imade, Iruma; Shinzo Matsui, Uenohara-machi; Hiroshi Sasaki, Hachioji; Takeshi Mori, Machida, all of Japan

[73] Assignee: Olympus Optical Co., Ltd., Tokyo, Japan

[21] Appl. No.: 527,405

[22] Filed: Sep. 13, 1995

[30] Foreign Application Priority Data

Sep. 19, 1994 [JP] Japan ................. 6-222309

[51] Int. Cl.⁶ ............. G06K 9/46; G06K 9/66; H04N 7/12; G11B 5/09
[52] U.S. Cl. ............. 382/190; 382/302; 348/401; 360/48
[58] Field of Search ............... 386/101; 360/48; 348/401; 382/190, 309, 302

[56] References Cited

U.S. PATENT DOCUMENTS 5,357,281 10/1994 Ikeda et al. ................. 348/401
5,404,248 4/1995 Shimoda et al. ............ 360/48
5,508,816 4/1996 Ueda et al. .................. 386/101

FOREIGN PATENT DOCUMENTS

WO 94/08314 4/1994 WIPO .................. G06K 1/12

Primary Examiner—Andrew W. Johns
Assistant Examiner—Monica S. Davis
Attorney, Agent, or Firm—Frishauf, Holtz, Goodman, Langer & Chick

[57] ABSTRACT

In a system for printing and recording multimedia information on an information recording medium in the form of an optically readable code pattern, reading the code pattern and restoring the original multimedia information, the code pattern of the information recording medium includes processing information necessary for editing and processing data according to the restoration processing procedure for restoring the multimedia information. Further, the restoration processing procedure includes a hierarchical structure of layers 1 to 5 and application process. In the layer 5 and application process, a set specification identifier determining section selects the decoding section, selects the reproducing output section and sets parameters according to the set specification name identifier and SDCH supplied as header information prior to user data of the subset from the layer 4.

20 Claims, 22 Drawing Sheets

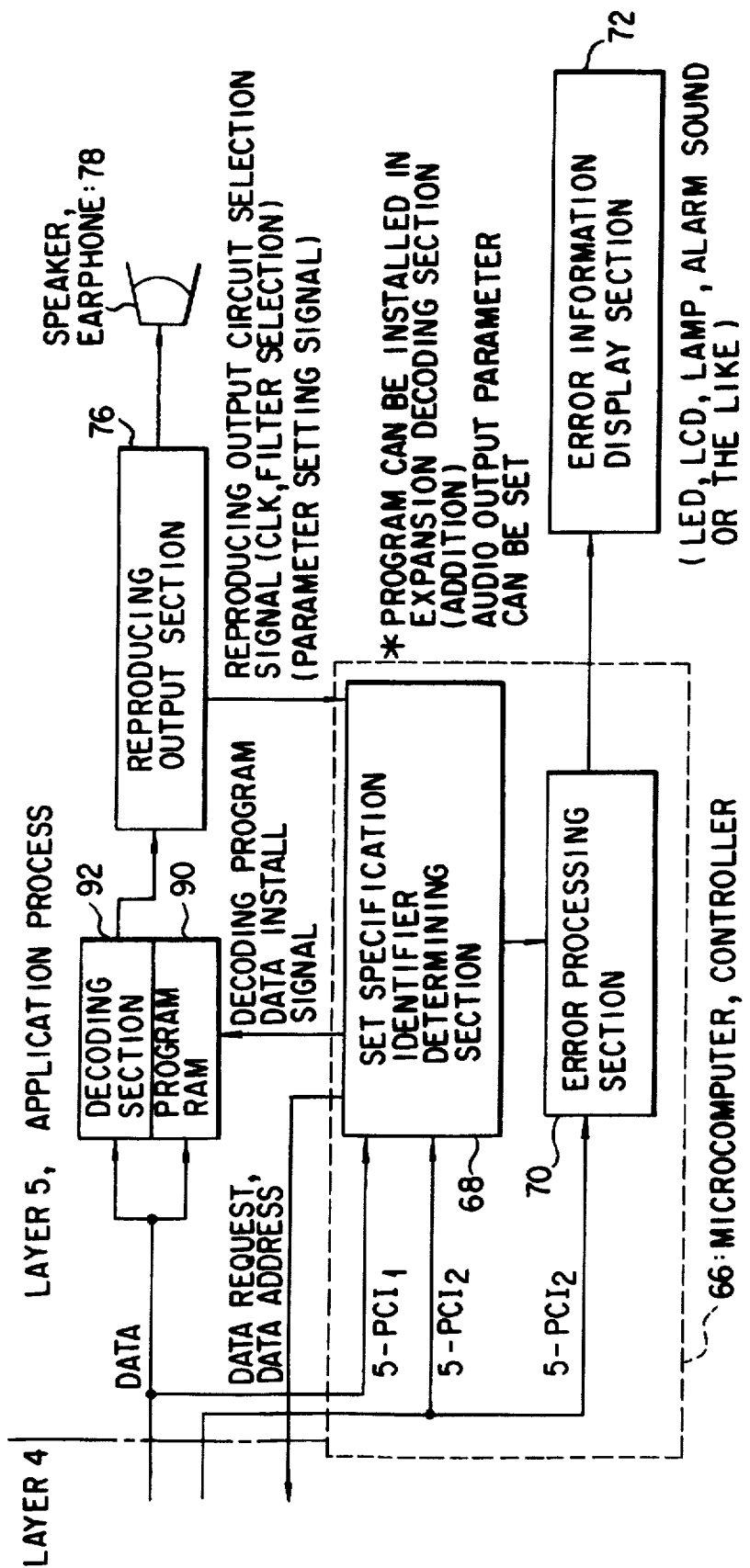
F I G. 21

|  | RED | | |
|---|---|---|---|
| GREEN | BLINKING | ON | OFF |
| BLINKING | SW ON | MANY ERRORS, REPRODUCING IMPOSSIBLE, SCAN CODE AGAIN | BATTERY POWER INSUFFICIENT |
| ON | DATA BEING PROCESSED | READING POSSIBLE, REPRODUCING IMPOSSIBLE (CODE IS MEANINGLESS) | READING POSSIBLE, REPRODUCING POSSIBLE |
| OFF | ERRONEOUS SWITCH OPERATION | MEANINGLESS CODE (CODE OTHER THAN MMP CODES AND STANDARD CODES) | NOT OPERATING |

F I G. 25A

| SW ON | 🔋 | PW ON |
|---|---|---|
| WAIT | OK | ERR. |
| SW ERR. | | |

F I G. 25B

INFORMATION RECORDING MEDIUM AND INFORMATION REPRODUCING APPARATUS CAPABLE OF STABLY REPRODUCING CHANGEABLE CODE PATTERNS AT HIGH SPEED

BACKGROUND OF THE INVENTION

1. Field of the Invention

This invention relates to an information recording medium such as paper for recording so-called multimedia information containing audio information such as voices and music, video information obtained by a camera, video device or the like, and digital code data obtained by a personal computer, word processor or the like in the form of an optically readable code pattern, and an information reproducing device for optically reading a code pattern recorded on the information recording medium and reproducing the original multimedia information.

2. Description of the Related Art

Conventionally, as recording media for recording voices and music, various types of media such as a magnetic tape and optical disk are known. However, the unit price of such media is expensive to some extent even if a large number of duplicates thereof are made, and a large space is required for storing such media. Further, in a case where it becomes necessary to give a medium having recording sounds thereon to another person in a remote place, a lot of labor and time is taken either when it is sent by post or when it is directly handed over. This is also true of so-called multimedia information containing video information obtained by a camera, video device or the like, and digital code data obtained from a personal computer, word processor or the like other than audio information.

Therefore, there has been proposed a system for recording multimedia information containing at least one of audio information, video information, digital code data on an information recording medium such as paper in the form of dot code as coded information or image information which can be sent by facsimile transmission and which can be duplicated in large quantities at low cost and a system for reproducing the information, as disclosed in International Application No. PCT/JP93/01377 (International Application KOKAI Publication No. WO 94/08314).

In the information reproducing system in the above International Application, a method of holding by hand an information reproducing device for optically reading and reproducing dot codes on the information recording medium, and manually scanning the device on the recording medium along the dot codes to read the dot codes is disclosed.

However, the dot code pattern itself remains in a stage in which the structure for enhancing the recording density is studied, and the information reproducing device and information recording medium in the above International Application are provided without fully taking the into account flexibility for future change into consideration.

Further, it is also desired to stably reproduce the code pattern disclosed in the above International Application at high speed.

SUMMARY OF THE INVENTION

This invention has been made in order to solve the above problems, and an object of this invention is to provide an information recording medium and information reproducing device capable of stably reproducing code patterns at high speed and dealing with code patterns even if the code pattern structure itself is changed in the future.

According to one aspect of this invention, there is provided an information reproducing medium having a portion in which multimedia information containing at least one of audio information, video information and digital code data is recorded in the form of an optically readable code pattern, the information recording medium being applied to restoring means for reading the code pattern and restoring the original multimedia information, the restoring means comprising:

first hierarchical processing means for converting the code pattern thus read into code data as an image, adding information relating to the reading to the code data as first processing information, and outputting the resultant information;

second hierarchical processing means for recognizing the first processing information output from the first hierarchical processing means, processing code data output from the first hierarchical processing means, creating blocks by collecting the code data for each preset unit, and outputting the blocks;

third hierarchical processing means for collecting the blocks output from the second hierarchical processing means, extracting second processing information at least necessary for creating supermacro-blocks of a larger preset unit from the code data of the blocks, recognizing the second processing information, creating supermacro-blocks based on the second processing information, extracting third information for effecting the error processing operation from the supermacro-blocks, recognizing the third processing information, effecting the error processing operation for the supermacro-blocks based on the third processing information, and outputting subset elements created by distributing the supermacro-blocks based on the third processing information;

fourth hierarchical processing means for extracting fourth processing information at least necessary for creating subsets constructed codes of preset unit which can permit the multimedia information to be restored from the subset elements output from the third hierarchical processing means and outputting subsets created based on the fourth processing information; and fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information, and wherein the code pattern contains at least the second to fifth processing information for executing the application process for adequately selecting and outputting reproducing data from the fifth hierarchical processing means for the respective data types based on the fifth processing information.

According to another aspect of this invention, there is provided an information reproducing device for optically reading a code pattern from an information recording medium having a portion in which multimedia information containing at least one of audio information, video information and digital code data is recorded in the form of an optically readable code pattern and restoring the original multimedia information, comprising:

first hierarchical processing means for converting the code pattern thus read into code data as an image, adding information relating to the reading as first processing information to the code data and then outputting the same;

second hierarchical processing means for recognizing first processing information output from the first hierarchical processing means to process code data output from the first hierarchical processing means, creating blocks by collecting the code data for each preset unit, and outputting the blocks;

third hierarchical processing means for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting the error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means for extracting fourth processing information at least necessary for creating subsets constructed by codes of a preset unit which permits the multimedia information to be restored by use of the subset elements output from the third hierarchical processing means from the subset element and outputting subsets created based on the fourth processing information;

fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information; and application process means for adequately selecting and outputting reproducing data from the fifth hierarchical processing means for the respective data types based on the fifth processing information.

According to still another aspect of this invention, there is provided an information reproducing device for optically reading a code pattern from an information recording medium having a portion in which multimedia information containing at least one of audio information, video information and digital code data is recorded in the form of an optically readable code pattern and restoring the original multimedia information, comprising:

first hierarchical processing means for converting the code pattern thus read into code data as an image, adding information relating to the reading as first processing information to the code data, and then outputting the same;

second hierarchical processing means for recognizing first processing information output from the first hierarchical processing means to process code data output from the first hierarchical processing means, creating blocks by collecting the code data for each preset unit, and outputting the blocks;

third hierarchical processing means for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting the error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means for extracting fourth processing information at least necessary for creating subsets constructed by codes of a preset unit which permits the multimedia information to be restored by use of the subset elements output from the third hierarchical processing means from the subset element and outputting subsets created based on the fourth processing information;

fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information; and application process means for adequately selecting and outputting reproducing data from the fifth hierarchical processing means for the respective data types based on the fifth processing information, and wherein the fifth hierarchical processing means includes error alarming means for effecting the error alarming process according to the fifth processing information.

According to another aspect of this invention, there is provided an information reproducing device comprising:

scanning means for optically reading a code pattern from an information recording medium having a portion in which multimedia information containing at least one of audio information, video information and digital code data is recorded in the form of an optically readable code pattern;

restoring means for restoring the code pattern read by the scanning means into original multimedia information; and error informing means for informing occurrence of error when the original multimedia information cannot be restored by the restoring means while determining whether the cause of non-reproduction is caused by an error occurring in the processing process by the scanning means or restoring means or by the fact that the information reproducing device is not applicable to the code pattern read by the scanning means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 13 is a flowchart for illustrating the decode mode and the reproducing parameter setting process in the third embodiment in detail;

FIG. 21 is a block construction diagram showing the layer 5 and the application process in the eleventh embodiment;

FIG. 23 is a diagram showing the file structure of a subset supplied from the layer 4 in the eleventh embodiment;

FIG. 25A is a diagram showing items of information which are displayed by the error information display section incorporated in the scanning section shown in FIG. 24; and FIG. 25B is a diagram showing items of information which are displayed by the error information display section incorporated in the data-reproducing section shown in FIG. 24.

DETAILED DESCRIPTION OF THE PREFERRED EMBODIMENTS

Before describing an embodiment of this invention, the code pattern of a dot code described in detail in International Application No. PCT/JP93/01377 (International Application KOKAI Publication No. WO 94/08314) is first explained.

Figure 1A:
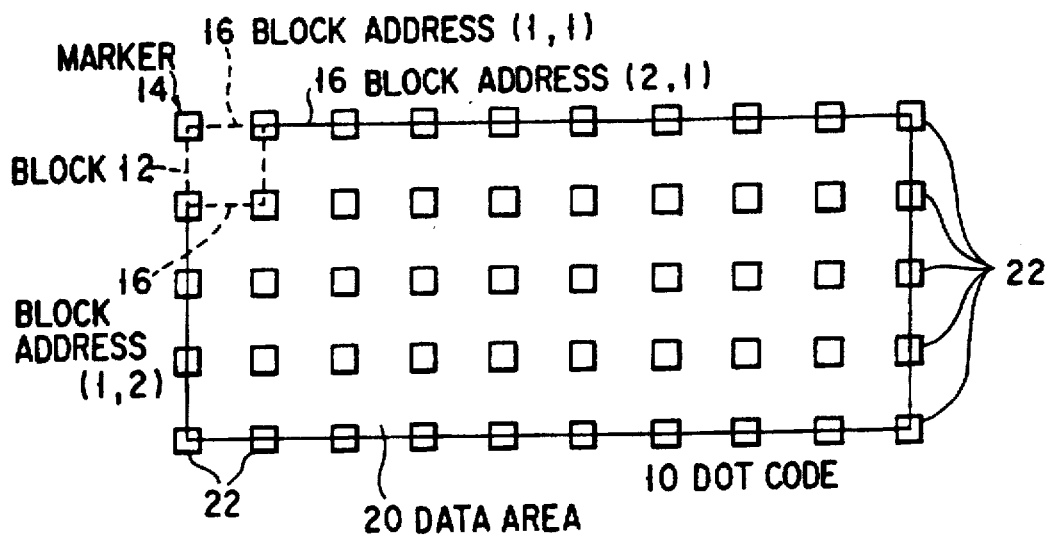
FIG. 1A and FIG. 1B are diagrams showing the format of a dot code.
Figure 1B:
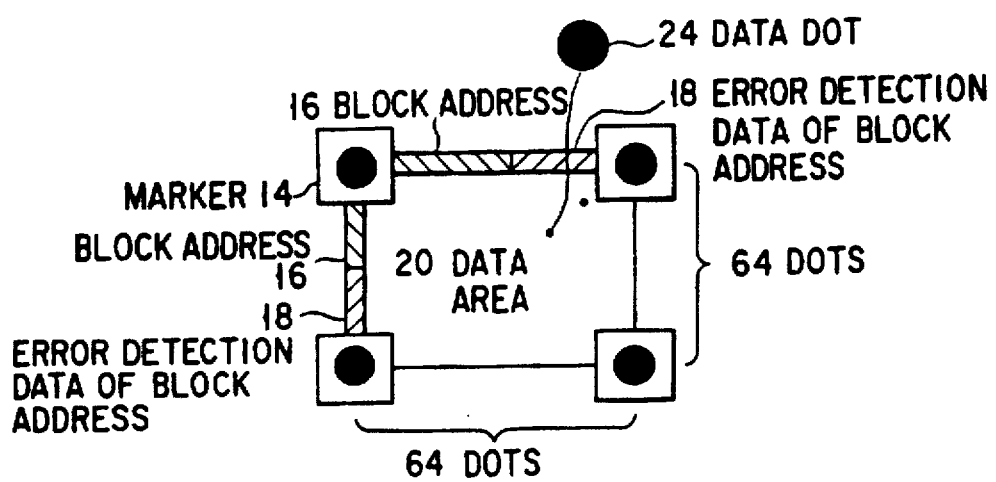

As shown in FIGS. 1A and 1B, a dot code 10 is constructed by arranging a plurality of blocks 12 each of which is constructed by a plurality of dots arranged according to the content of data. That is, the blocks 12 which are treated as data for every given unit are collectively arranged. Each of the blocks 12 are constructed by a marker 14, block addresses 16, address error detection data 18, and a data area 20 into which actual data is set.

The blocks 12 constructing the dot code 10 are arranged in a two-dimensional form and the block addresses 16 are added to each of the blocks. An address for the X and Y addresses is attached to the block address 16. For example, in FIG. 1A, the X and Y addresses of a block lying in the uppermost and leftmost position are set to (1, 1). The block address of a block lying on the right side of the above block is set to (2, 1). In the same manner, a block address obtained by incrementing the X address for a block lying in the farther position in the right direction and incrementing the Y address for a block lying in the farther position in the downward direction is attached to the block, and thus the block address 16 is attached to each of the blocks 12.

Markers lying in the downmost position and markers lying in the rightmost position are treated as dummy markers 22. That is, the block 12 for one of the markers 14 is data in an area surrounded by four markers 14 containing the above marker and lying in the lower right position with respect to the above marker, and the markers in the lowermost position and rightmost position are auxiliary markers arranged to define the blocks lying in the second positions from the lowermost and rightmost positions, that is, dummy markers 22.

Next, the content of the block 12 is explained. As shown in FIG. 1B, a block address 16 and error detection data 18 of the block address are attached between the marker 14 of the block 12 and a lower marker thereof. Likewise, a block address 16 and error detection data 18 of the block address are attached between the marker 14 of the block 12 and a marker on the right side thereof. Thus, the block addresses 16 are arranged on the left side and upper side of the data area 20 and the marker 14 is arranged on the upper left corner of the data area. In this case, an example in which the block addresses 16 are recorded on two portions of one block are shown, but it is possible to record the block address in one portion. However, if the block addresses are recorded on two portions, the block address can be reliably detected by detecting one of the two block addresses even if noise is superposed on the other block address and an error occurs, and therefore, it is preferable to record the block addresses in two portions.

By using the above-described two-dimensional block division system, the advantages that it can easily attain the enlargement, reduction, and deformation and cope with unintentional movement of hands can be attained since normalization is effected by detecting four adjacent markers and equally dividing a marker-to-marker portion by the number of dots on the information reproducing device side.

The each of data dots 24 in the data area 20 has the dot size of several ten μm, for example. The size of the data dot may be reduced to several μm depending on applications or purposes of usage, but in general, the size is set to 40 μm, 20 μm or 80 μm. For example, the data area 20 has the size of 64×64 dots. The sizes can be freely enlarged or reduced in a range in which an error caused by the equal division can be neglected. The marker 14 has a function of position index and is set to have the size which modulated data does not have, and may be formed in a circular form with the size of seven or more dots of the data dots 24, for example, or formed as a black circular mark with the size of approx. 7×7 dots. The block address 16 and error detection data 18 are constructed by the same dots as the data dots 24.

Next, an explanation is made for an example of hierarchical segmentation of information transfer protocol in a multimedia paper (MMP) system for recording or reproducing multimedia information in the form of dot pattern code as one example of an optically readable code pattern on or from an information recording medium such as paper as is described in detail in Jpn. Pat. Appln. No. 6-121368 (International Application No. PCT/JP95/01050) by the inventors of this invention. In this case, the layer N (N=1 to 5) protocol is an operational rule for realizing a function necessary for the layer N to comply with a request from the adjacent layer.

Figure 2:
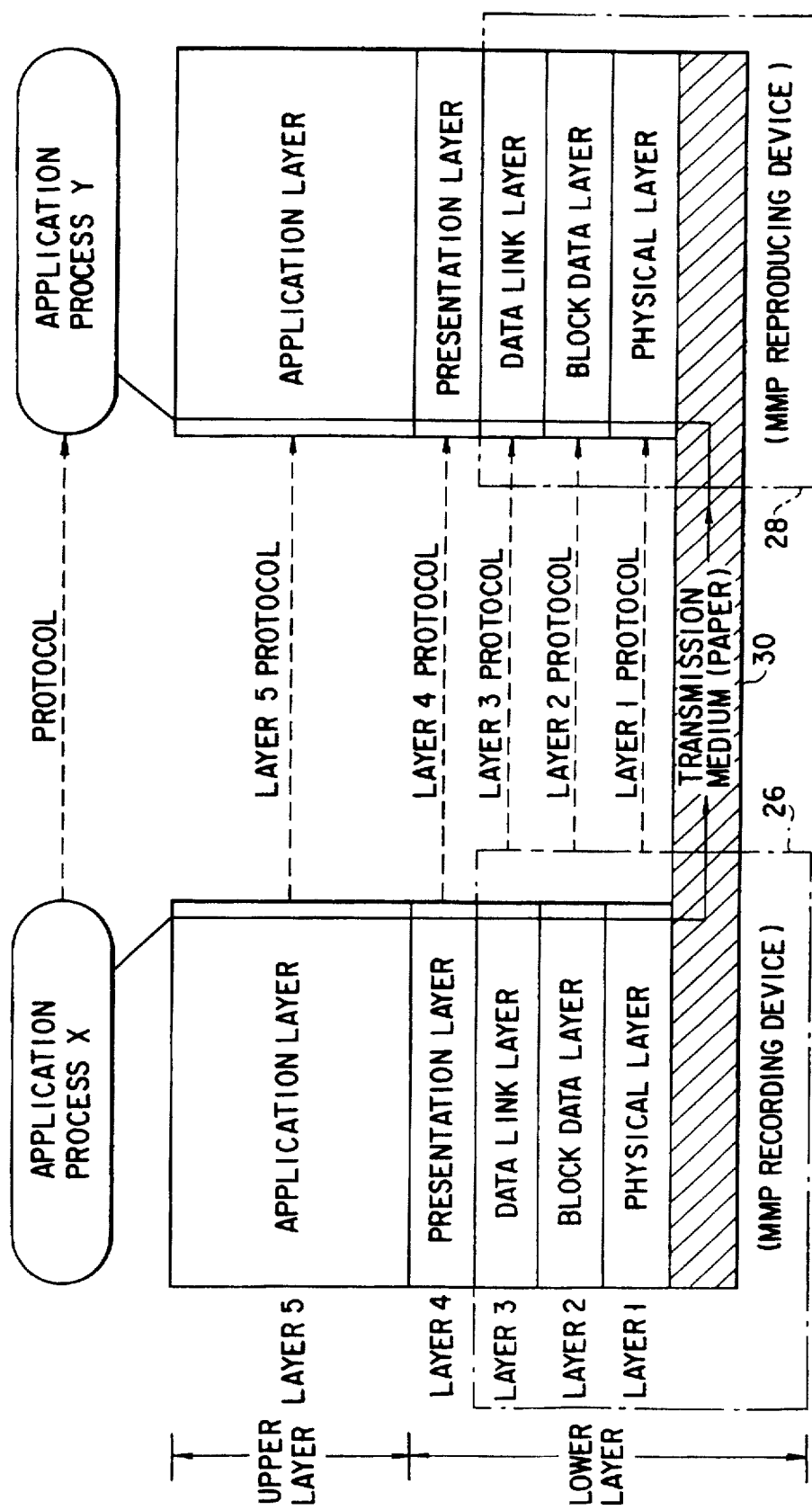
FIG. 2 is a diagram showing an example of hierarchical segmentation of an information transfer protocol in a multimedia paper system.

As shown in FIG. 2, the hierarchical segmentation includes a plurality of logical hierarchical structures of the layers 1 to 5 on both of the recording and reproducing sides.

On the recording side, so-called multimedia information, caused in an application process X, generally, an application program on the computer, containing audio information such as voices and music, video information derived from a camera or video device, and digital code data obtained from a personal computer or word processor is transferred to an MMP recording device 26 used as an information recording device via the application layer (layer 5) and presentation layer (layer 4) constructed on the computer. In the MMP recording device, received data is printed or recorded on an information recording medium (transmission medium) 30 such as paper as an optically readable dot code pattern by the data link layer (layer 3), block data layer (layer 2) and physical layer (layer 1).

The information recording medium (transmission medium) 30 is handed over to the reproducing side. Alternatively, the code pattern recorded on the medium 30 can be sent to the reproducing side by facsimile and printed or recorded on the information recording medium 30 such as paper on the reproducing side.

In the MMP reproducing device 28, the code pattern recorded on the information recording medium 30 is photographed, the data editing process is effected according to the restoring processing procedure from the layer 1 to the layer 3 or to the layer 5 in the reverse order of the order at the recording time, and resultant data is given to the reproducing side computer. In the reproducing side computer, reproduced multimedia information is given to the application process (application program) Y via the processing function of the layers 4 and 5, if necessary, in the reverse order of the order on the recording side.

Next, each layer (hierarchy) of the reproducing side is explained in detail, and since the layers of the recording side are just opposite to those of the reproducing side, the explanation therefor is omitted.

Figure 3A:
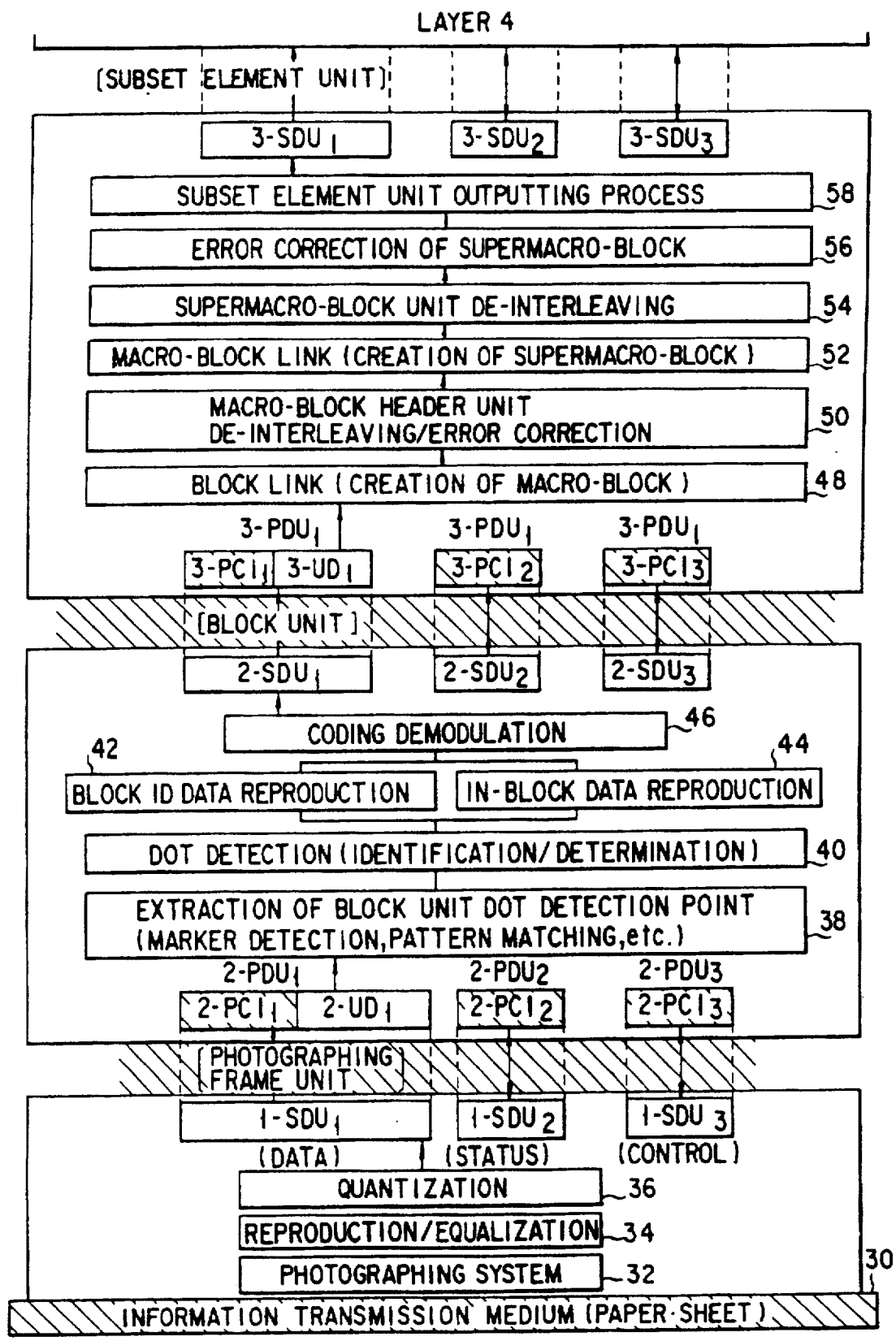
FIGS. 3A and 3B are diagrams showing an example of the construction of a hierarchical structure on the reproducing side.
Figure 3B:
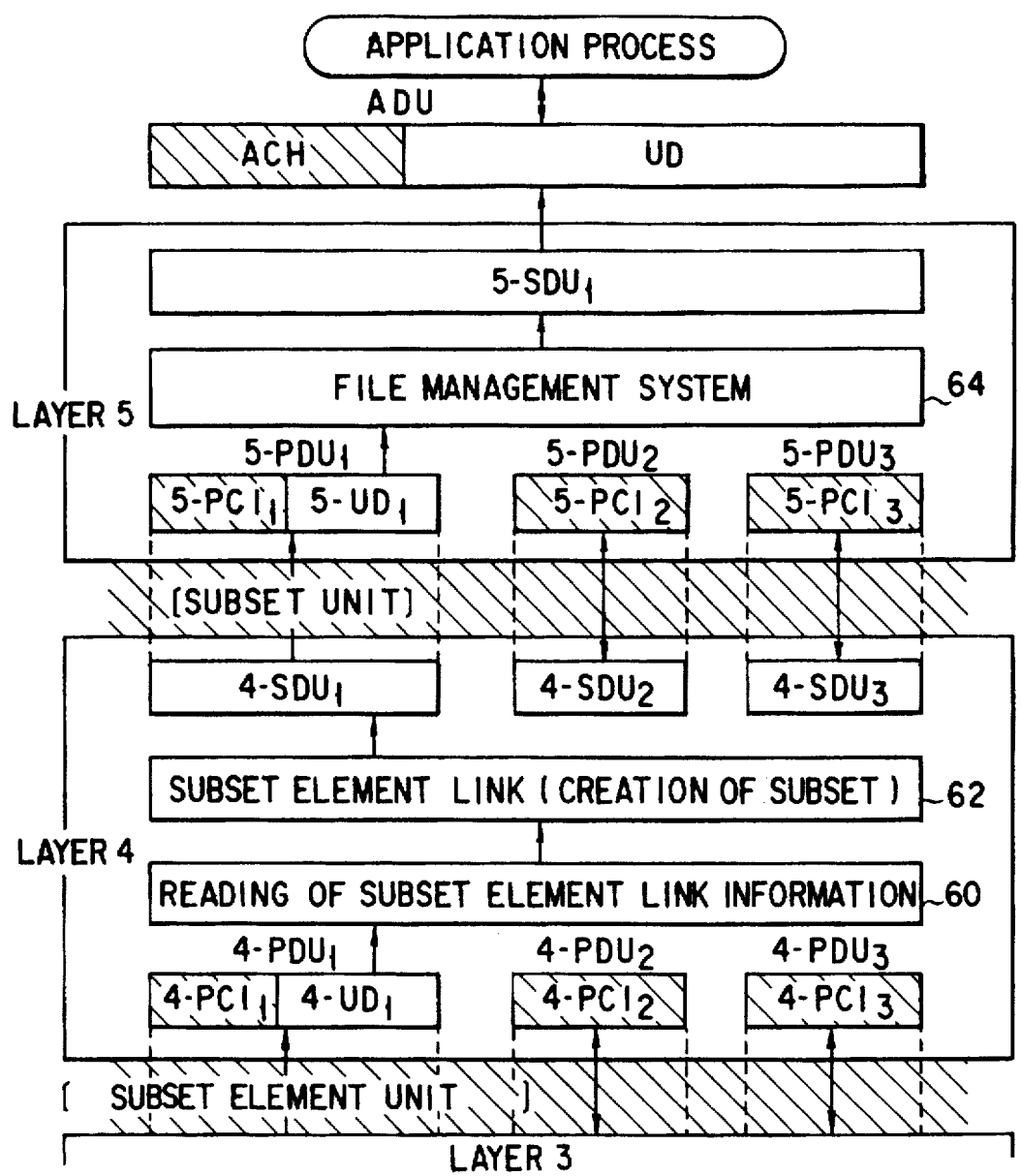

FIG. 3A and FIG. 3B are diagrams showing an example of the procedure of a process effected over multiple stages by use of a plurality of hierarchical structures on the reproducing side. In the drawing, N-SDU$_n$ indicates the Nth layer service data unit No. n, N-PDU$_n$ indicates the Nth layer protocol data unit No. n, N-PCI$_n$ indicates the Nth layer protocol control information No. n (corresponding to various processing information in this invention), N-UD$_n$ indicates the Nth layer user data No. n, ADU indicates the application data unit, and ACH indicates the application control header (n=1 indicates data, n=2 indicates status information, and n=3 indicates control information).

First, the layer 1 (physical layer) plays a basic role of ensuring reliably transmission of quantization data of a dot image. The layer 1 defines electrical/physical conditions and various conditions for quantization (that is, simple transfer rule of the dot pattern, equalization system, quantization system and the like). The intra-layer function required for the layer 1, that is, the service provided therefor includes provision of a plurality of transmission media (paper types), permission of plural dot density, provision of a plurality of scanner resolutions, provision of a plurality of transmission means for video signals, and provision of reading starting/ending function, and it may further include representation of a plurality of gradations (binary value, multiple values) of dots, and permission of multiplexed representation of dots (color image photographing, transmission) as required.

The layer 1, that is, the physical layer has a functional module (photographing-system module 32) of optically photographing or picking up a dot code pattern recorded on the information recording medium (transmission medium) 30 such as paper and outputting an image signal, and a functional module (reproduction equalizing module 34, quantization module 36) of subjecting an image signal to the pre-processing (gain control, equalization processing) and then sampling/quantizing the signal. Further, it has a functional module of converting the quantized value into digital data to create image data, a functional module of forming image data into a structure form to convert the data into a given data format constructed by structure information (header, that is, first processing information) and data (substance of image data) and outputting the same to an adjacent upper layer, that is, the layer 2, a functional module of inputting/outputting status information and control information relating to the process and the like.

Structured (image) data of photographing frame unit is given from the layer 1 to the upper layer 2 as a service data unit (1-SDU$_1$).

The layer 2 (block data layer) plays a basic role of reliably transmitting a block and a bit string in the block (in-block bit string). The layer 2 defines various conditions (that is, block detection system, channel bit detection system, coding modulation/demodulation system, and the like) for block transmission. The intra-layer function required for the layer 2, that is, the service provided therefor includes block extraction and detection of dot sampling points, provision of a plurality of recording systems (provision of binary value, multiple values, multiplexed system and the like), provision of a plurality of block patterns, provision of a plurality of coding modulation/demodulation systems, detection of the relative position of the block, information of block detection error, obstruction overcoming operations and the like. In this case, provision of a plurality of block patterns includes a block size detection function, marker definition/detection function, adaptation of the readout order of various dots and the like.

The layer 2, that is, the block data layer includes a functional module of receiving structured (image) data (1-SDU$_1$) input from the adjacent lower layer, that is, the layer 1 as 2-PDU$_1$, recognizing and dividing the structure information (2-PDI$_1$, that is, first processing information) and data substance (2-UD$_1$), and converting the data substance into a suitable form for the process, a functional module (block-unit dot detection point extraction (marker detection, pattern matching and the like) module 38, dot detection (identification/determination module 40) of processing the data substance converted into the suitable form for the processing and extracting a plurality of blocks formed in a block form for every given information code unit, and a functional module (block ID data reproducing module 42, in-block data reproducing module 44) of processing the extracted block and reproducing the information code of block unit. In this case, the information code of block unit contains data substance, coding modulation information and structured information for linking a plurality of blocks. Further, the layer 2 has a functional module (coding demodulation module 46) of reading the coding modulation information from the information of block unit and demodulating the data substance according to the coding modulation information, a functional module of outputting structured data (block header, that is, second processing information) of the demodulated block-form information code and data substance (user data) to the adjacent upper layer, that is, the layer 3 as 2-SDU$_1$, a functional module of inputting/outputting control information and status information relating to the processing, and the like.

That is, in the layer 2, a block unit dot detection point or marker is detected from image data for every block data which is the first given unit, and data dots are detected for every block unit according to the detected marker to restore data of bit string. The detail of the processing is described in International Application No. PCT/JP93/01377 (International Application KOKAI Publication No. WO 94/08314). For data of the block unit, a header or block ID data is reproduced, then in-block data is reproduced as user data, demodulation for coding is effected and the data is given to the upper layer, that is, the layer 3 as data of block data unit.

The layer 3 (data link layer) plays a basic role of creating a given data mass (subset element (fourth given unit)) which is ensured to have a preset error quality and ensuring reliably transmission. The layer 3 defines conditions for linking block data (first given unit) and various conditions (that is, interleave system/structure) for creating macro-blocks (third given unit)/supermacro-blocks (second given unit), (super) macro-block header and user data error control (that is, ECC system/structure) and the like. The intra-layer function required for the layer 3, that is, the service provided therefor includes provision of a function of restoring an abnormal condition of block address reading/writing, determination of a reading state of a desired block (checking of a block of valid reading), setting of block arrangement structure, creation of intermediate data masses, provision of a plurality of interleave systems/ranges/structures, provision of a plurality of ECC systems/ranges/structures, and the like.

The layer 3, that is, the data link layer has a functional module (block link (macro-block creation) module 48) of receiving a block-formation information code (2-SDU$_1$) input from the adjacent lower layer, that is, the layer 2 as 3-PDU$_1$, recognizing and reading structured information (3-PCI$_1$, that is, second processing information) from the input code, and linking a plurality of data substances (3-UD$_1$) of block unit according to the structured information to create (construct) a macro-block or supermacro-block. That is, it receives bit data strings in the block unit from the layer 2, recognizes and divides a block header as 3-PCI$_1$ (second processing information) of a given number of bits from the head of each block and a user data as 3-UD$_1$, and linking blocks according to information described in the block header to create a macro-block. The thus created macro-block is constructed by attached information (macro-block header, that is, one of second processing information) dispersedly arranged in the block and data substance (user data).

Further, the layer 3 has a module (macro-block header unit de-interleave/error correction module 50) of reading the interleave information from the macro-block header, de-interleaving the user data of the macro-block according to the interleave information, reading the error correction information from the macro-block header, and performing the error correction process to the de-interleaved user data according to the error correction information, a functional block (macro-block link (supermacro-block creation) module 52) of reading structured information for creating (constructing) a supermacro-block from the macro-block header, and linking a plurality of macro-blocks according to the structured information to create (construct) a supermacro-block, a functional module (supermacro-block unit de-interleave module 54) of reading interleave information from the macro-block header and de-interleaving user data of the supermacro-block according to the interleave information, a functional module (supermacro-block unit error correction module 56) of reading error correction information from the macro-block header and correcting the error of the user data subjected to the de-interleaving process according to the error correction information, a functional module (subset element unit output processing module 58) of reading structure specifying information of a subset element, that is, subset element header from the macro-block header and separating the subset element from the user data of the supermacro-block after the error correction according to the subset element header, a functional module of outputting the separated subset element unit to the adjacent upper layer, that is, the layer 4 as 3-SDU$_1$, and a functional module of inputting/outputting status information and control information relating to the process.

That is, the layer 3 has a multi-stage function of first linking or coupling the blocks to create a macro-block and then linking the macro-block to a supermacro-block. Then, after the error correction process, it reads the subset structure specification (third processing information) described in the macro-block header, separates the supermacro-block into data corresponding to the concept of subset elements, and outputs the subset elements. That is, data is given to the upper layer as 3-SDU$_1$ in the unit of subset element.

The layer 4 (presentation layer) plays a basic role of ensuring creation of a subset. The layer 4 defines various conditions for linking subset elements to create a subset. The intra-layer function required for the layer 4, that is, the service provided therefor includes selection of subset elements necessary for an object file, creation of the subset and determination of the condition therefor, and adaptable data conversion for DOS or the like. The subset indicates recognizable information unit data. That is, the macro-block and supermacro-block contain multimedia information such as sound and picture and each of data masses obtained by dividing the above block into data masses each of which is limited to information relating only to sound or information relating only to picture so as to be recognized as one type of information unit is called a subset.

The layer 4, that is, the presentation layer has a functional module (subset element link information reading module 60) of receiving data (3-SDU$_1$) of subset element unit input from the adjacent lower layer, that is, the layer 3 as 4-PDU$_1$ and reading structured information (4-PCI$_1$, that is, fourth processing information) from the received data, and a functional module (subset element link (subset creation) module 62) of linking data substances of subset element unit according to the read structured information to create (construct) a subset. Data of subset element unit is constructed by structured information (subset element header) for linking subset elements to create (construct) a subset and user data substance.

Further, the layer 4 has a functional module of reading attached information necessary for an existing or new interface with the adjacent upper layer from the created subset and attaining the interface matching, a functional module of outputting part of the subset or the entire attached information and data substance as 4-SDU$_1$ to the adjacent upper layer, that is, the layer 5, and a functional module of inputting/outputting control information and status information relating to the process.

The layer 5 (application layer) plays a basic role of unfailingly ensuring that the file management can be carried out in good condition. The layer 5 defines various conditions (that is, file creating condition and the like) for effecting the file management. The intra-layer function required for the layer 5, that is, the service provided therefor includes provision of the read/write process of a subset or file of application request.

The layer 5, that is, the application layer has a functional module (file management system module 64) of receiving subset data (4-$SDU_1$) input from the adjacent lower layer, that is, the layer 4 as 5-$PDU_1$, reading file management information from the attached information (5-$PCI_1$, that is, fifth processing information) or data substance (5-$UD_1$), effecting the file management according to the file management information, and reading data in the unit of subset or in the unit of file after linking subsets to create a file, a functional module of outputting data unit of the file unit or subset unit created based on the file management as 5-$SDU_1$ to the application process, and a functional module of inputting/outputting control information and status information relating to the process.

The application process plays a basic role of realizing the application using the MMP system. The application process includes the source sample data shuffling system/structure, scramble system/structure for ciphering, and data compression system/structure, data structure of sound, text or image and the like. The function required for the application process, that is, the service provided therefor includes provision of source sample data shuffling system, provision of scramble system and the like, and it may further include provision of a plurality of data compression systems and compression/expansion operations, determination of information types, selection of data structure and the like, if required.

Now, one embodiment of this invention is explained with reference to the accompanying drawings. This invention relates to the detail of the layer 5 (application layer) and the application process layer in the case of stand-alone type for realizing the hierarchical structure described in Jpn. Pat. Appln. No. 6-121368 (International Application No. PCT/JP95/01050).

[First Embodiment]

Figure 4:
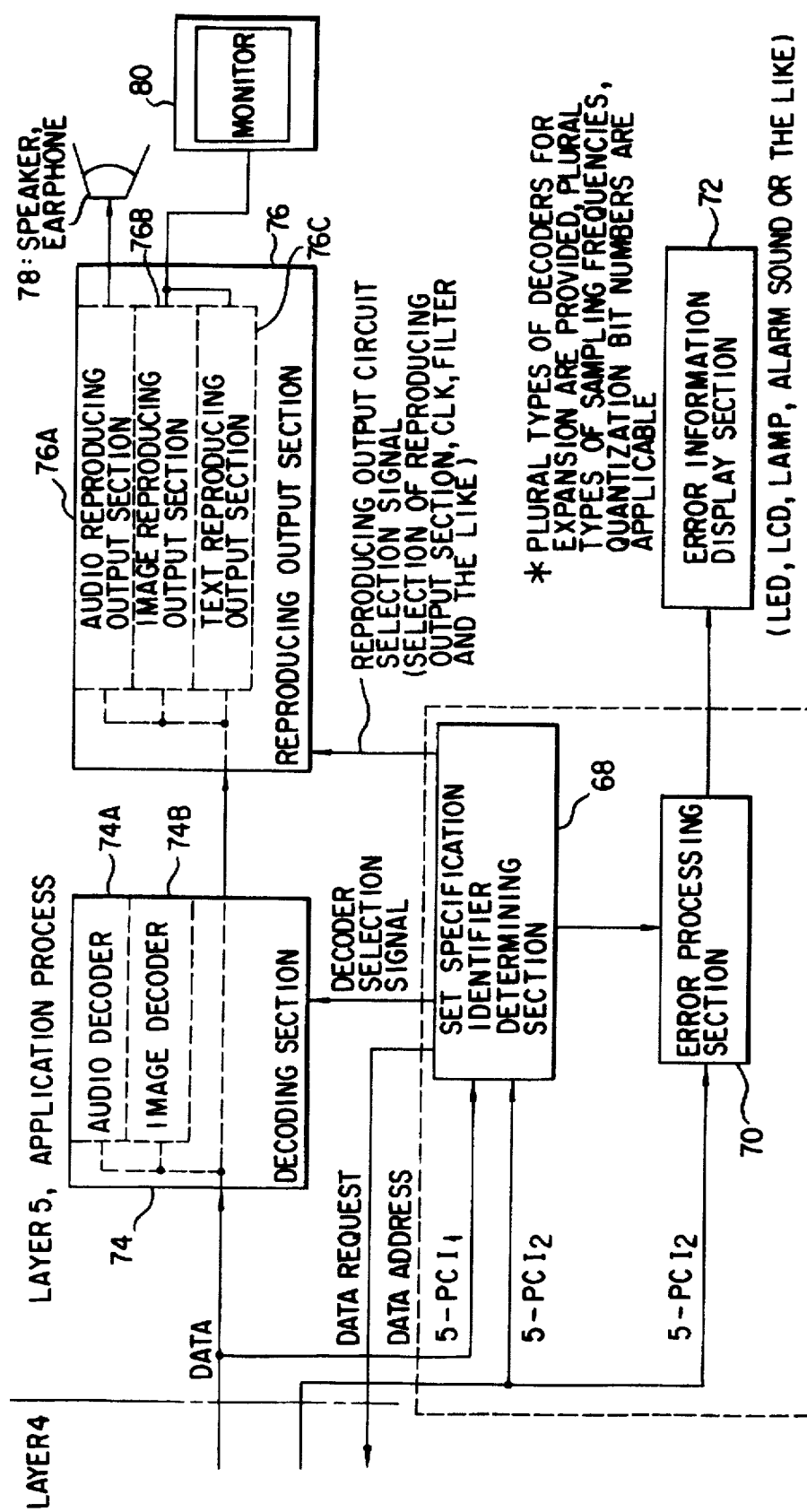
FIG. 4 is a block construction diagram of the layer 5 and the application process in the first embodiment.

FIG. 4 is a diagram showing the structure of the first embodiment.

A microcomputer or controller 66 constructs a set specification identifier determining section 68 and an error processing section 70, and it receives a subset from the layer 4, that is, it receives 4-$SDU_1$ as 5-$PDU_1$, receives 4-$SDU_2$ which is a status signal as 5-$PCI_2$, and receives 4-$SDU_3$ which is a parameter setting signal as 5-$PCI_3$. The set specification identifier determining section 68 determines whether the readout code information is a dot code 10 or not, whether it matches with the specification or not, and whether it can be reproduced by use of the hardware or not based on 5-$PCI_2$ and 5-$PCI_1$ among 5-$PDU_1$, and if the result of determination is "NO", it causes the error processing section 70 to effect the error processing operation and causes the error information display section 72 to display the error state. Further, the set specification identifier determining section 68 effects processes of setting parameters for reproduction, setting selection of the decoder of the decoding section 74, and selection of the reproducing output section 76 and the like. Further, it outputs a data request, data address and the like to the layer 4.

The decoding section 74 receives and decodes 5-$UD_1$ among 5-$PDU_1$ and includes an audio decoder 74A for decoding audio information and an image decoder 74B for decoding image information. Text information is output as it is. That is, since a subset or data obtained in the form of data mass which is limited to information relating only to sound, information relating only to image or information relating only to text so as to be recognized as one information unit is input from the layer 4, an adequate decoding process corresponding to the information is effected. For example, in the case of audio information, if data is compressed in the compression system of CELP system in which the information is specified to human languages, a corresponding decoding process is effected in the audio decoder 74A. Further, in the case of image information, if data is compressed in the compression system of JPEG system, a corresponding expanding process is effected in the image decoder 74B. The decoders 74A and 74B are selectively operated by a decoder selection signal from the set specification identifier determining section 68.

The reproducing output section 76 receives a decoded output from the decoder section 74 and converts the same into a signal suitable for the output device and includes an audio reproducing output section 76A, image reproducing output section 76B and text reproducing output section 76C. The reproducing output sections 76A, 76B, 76C are selectively operated by a reproducing output circuit selection signal from the set specification identifier determining section 68, and in this case, since the audio reproducing output section 76A is designed to cope with plural types of clocks and filters, for example, the clock and filter for the sampling frequency of 7 kHz or 8 kHz, or the clock and filter for the sampling frequency of 48 kHz of CD quality, the clock and filter can also be selected by the reproducing output circuit selection signal. Likewise, in the case of image information, the image reproducing output section 76B converts the image size into 640×480 dots, for example, according to the reproducing output circuit selection signal. Further, in the case of text information, the text reproducing output section 76C converts text information into characters.

Then, an output signal of the audio reproducing output section 76A is output as a voice from an audio output device 78 such as a speaker, earphone or headphone. Further, output signals from the image reproducing output section 76B and text reproducing output section 76C are displayed on a display output device 80 such as a monitor.

When some error has occurred, the error processing section 70 informs occurrence of error to the user by lighting an alarm lamp of LED, displaying markers or characters by LCD, lighting a red or yellow lamp on the error information display section 72, or generating beep sound or giving warning by voice according to the type of the error.

Now, data input from the layer 4 is explained with reference to FIG. 5.

Basically, data is transferred from the layer 4 in the form of subset, and a file header area 84 is exceptionally attached in the front portion of the top subset header area $82_1$ which is first arranged in the subset. In the drawing, three subsets are successively shown to simultaneously indicate cases of audio, image and text information, but in practice, data is transferred for each subset.

In the file header area 84, a next subset data control header (SDCH) pointer 84A, set specification name identifier 84B and information 84C indicating the presence/absence of SDCH are inserted. A user data format (UDF) 86 indicating that the header is a file header is set in front of the file header area 84.

The next SDCH pointer 84A takes an area of four bytes and designates a head address of the next SDCH. The set specification name identifier 84B includes a file specification name (for example, "m, p, 1") $84B_1$ of three bytes, file specification version $84B_2$ of three bytes, and set specification name and set specification version $84B_3$ and $84B_4$ of eight bytes in total. The set specification name $84B_3$ indicates the specification name to make it unnecessary to refer to each SDCH in a case where the specification value of each SDCH is determined by the individual specification. Further, the presence/absence-of-SDCH indicating information 84C indicates the presence or absence of SDCH.

Further, in the subset header areas $82_1$, $82_2$ and $82_3$, different information items corresponding to the types of data items inserted into the data areas $88_1$, $88_2$ and $88_3$ of the corresponding subset are inserted.

For example, the subset area $82_1$ indicates a case wherein audio data is inserted into the data area $88_1$, and the subset data control header (SDCH) $82_{11}$ is constructed by a user data format (UDF) $82_{11}a$, next SDCH pointer $82_{11}b$, parameter $82_{11}c$, and data area starting and ending addresses $82_{11}d$, $82_{11}e$.

The UDF $82_{11}a$ indicates the type of data inserted into the corresponding data area $88_1$, and in this case, information of "audio" is inserted. In the next SDCH pointer $82_{11}b$, the head address of SDCH of the next subset header is inserted. In this case, the absence of a next subset is indicated by inserting a value, for example, "$FF_H$ ($_H$ indicates a hexadecimal number)" or "$00_H$," which the content of the next SDCH pointer cannot take as an address.

In this case, in the parameter $82_{11}c$, a parameter for audio is inserted, and the following information items are inserted, for example.

$A_{d0}$: audio data is present (1:present);

$A_{d1}$: stereo (1:stereo);

$A_{d2}$: R/L order (1:R, 0:L);

$A_{d3}$ to $A_{d7}$: reservation;

$A_{d8}$ to $A_{d15}$: compression system;

$A_{d16}$ to $A_{d23}$: quantization bit number;

$A_{d24}$ to $A_{d31}$: sampling frequency;

$A_{d32}$ to $A_{d39}$: reservation;

$A_{d40}$ to $A_{d71}$: data size (four bytes).

In this case, information of "audio data is present" indicates whether audio information is present or not, and information of "stereo" indicates whether data is stereo or not. Information of "R/L order" indicates whether the arrangement of data is "right, left" or "left, right" in the case of stereo. Information of "reservation" indicates an available area to be used later when an additional parameter is provided. Information of "compression system" specifies the compression system such as CELP system, and information of "quantization bit number" indicates that the quantization bit number is 8 bits, 16 bits or 14 bits, for example. Information of "sampling frequency" indicates that the sampling frequency is 8 kHz, 16 kHz, 32 kHz or 48 kHz, and information of "data size" indicates the amount of total data in the data area $88_1$.

In the data area starting and ending addresses $88_{11}d$ and $88_{11}e$, the head address and end address of the corresponding data area $88_1$ are inserted.

Likewise, the subset header area $82_2$ indicates a case wherein image data is inserted into the data area $88_2$, and the SDCH $82_{21}$ is constructed by a UDF $82_{21}a$, next SDCH pointer $82_{21}b$, parameter $82_{21}c$, and data area starting and ending addresses $82_{21}d$, $82_{21}e$. In this case, as the parameter $82_{21}c$, the following information items are inserted, for example.

$V_{d0}$: image data is present (1:present);

$V_{d1}$ to $V_{d0}$: color system;

$V_{d4}$: γ characteristic (1:0.45, 0:1);

$V_{d5}$ to $V_{d7}$: reservation;

$V_{d8}$ to $V_{d15}$: compression system;

$V_{d16}$ to $V_{d23}$: quantization bit number;

$V_{d24}$ to $V_{d39}$: horizontal pixel number;

$V_{d40}$ to $V_{d55}$: vertical pixel number;

$V_{d56}$ to $V_{d63}$: reservation;

$V_{d64}$ to $V_{d95}$: data size.

In this case, information of "color system" indicates whether image data is a color image or black and white image, and if it is a color image, the information also indicates whether the image data is based on RGB, or on cyan, magenta and color difference component. Information of "γ characteristic" indicates whether the γ characteristic is 1 or 0.45, information of "compression system" indicates the compression system such as JPEG system. Information of "quantization bit number" indicates 8 bits, 6 bits or 10 bits or more which is more precise. Further, information items of "horizontal pixel number" and "vertical pixel number" define the size of an image plane used for forming a 2-dimensional image. For example, it indicates whether the image is a so-called VGA image of 640×480 dots or a high-resolution image such as a so-called SVGA image of 1260×1090 dots.

Likewise, the subset header area $82_3$ indicates a case wherein text data is inserted into the data area $88_3$, and the SDCH $82_{31}$ is constructed by a UDF $82_{31}a$, next SDCH pointer $82_{31}b$, parameter $82_{31}c$, and data area starting and ending addresses $82_{31}d$, $82_{31}e$. In this case, as the parameter $82_{31}c$, the following information items are inserted, for example.

$T_{d0}$: text data is present (1:present);

$T_{d1}$: application header is present;

$T_{d2}$ to $T_{d7}$: reservation;

$T_{d8}$ to $T_{d15}$: compression system;

$T_{d16}$ to $T_{d23}$: format;

$T_{d24}$ to $T_{d39}$: horizontal character number;

$T_{d40}$ to $T_{d55}$: vertical character number;

$T_{d56}$ to $T_{d63}$: reservation;

$T_{d64}$ to $T_{d95}$: data size.

The explanation for the "compression system" in the decoding section 74 in FIG. 4 is made based on the assumption that text data is not compressed, but it becomes necessary to compress the data when the amount of data becomes large, and the compression system used in such a case is described here.

Data items in the file header area 84 and subset header areas $82_1$, $82_2$, $82_3$ are supplied to the set specification identifier determining section 68 as 5-$PCI_1$ and data items in the data areas $88_1$, $88_2$, $88_3$ are input to the decoding section 74.

Figure 6:
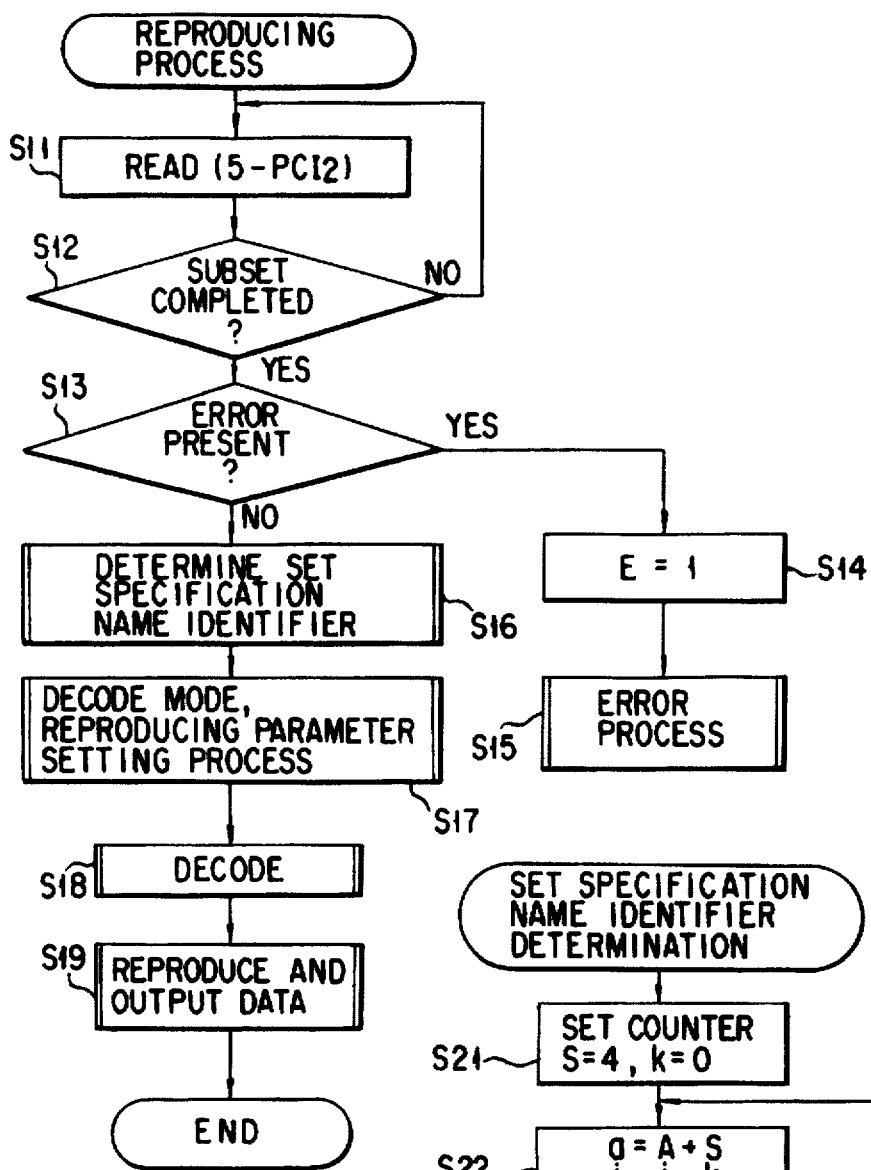
FIG. 6 is a flowchart for illustrating the operation of reproducing process in the first embodiment.

FIG. 6 is a flowchart of the reproducing process with the construction of FIG. 4.

First, the set specification identifier determining section 68 reads 5-$PCI_2$ which is a status signal (step 11) and checks whether a subset is completed or not (step S12). Since data is transferred from the layer 4 to the layer 5 when the data for one subset unit is obtained and a status signal indicating that the data for one subset unit is obtained or the subset can be output is supplied as 5-PCI$_2$, it becomes possible to determine whether the subset is completed or not according to the signal. If the subset is not yet completed, the step S11 is effected again.

If the subset is completed, whether the presence or absence of error is checked according to error information contained in the status signal of 5-PCI$_2$ (step S13). That is, whether or not an error is generated in the process effected up to the layer 4, that is, whether or not block data has been read as a code or whether or not the error correction has been completely effected in the error correcting process can be determined.

If the error information is not good, that is, if the error is present, an error flag E is set to "1" (step S14) and then the error process as will be described later is effected (step S15). That is, the error processing section 70 effects the error display corresponding to the type of error by lighting an alarm lamp of LED, displaying markers or characters by LCD, lighting a red or yellow lamp on the error information display section 72, or generating beep sound or giving warning by voice, for example.

If no error is present, the set specification identifier determining section 68 effects the process of determining the set specification name identifier 84B of the file header area 84 among 5-PCI$_1$ (step S16). Whether it is a reproducible code or not is determined according to the set specification name identifier 84B. The process is explained in detail later.

Next, the decode mode and reproducing parameter setting process which is described later in detail is effected (step S17). That is, a decoder selection signal, reproducing output circuit selection signal and parameters such as a clock and filter necessary for the reproducing process are extracted and set according to 5-PCI$_1$. The decoder selection signal is input to the decode section 74, the reproducing output circuit selection signal and parameters are input to the reproducing output section 76, and various parameters are set and selected.

After this, data in the data area of 5-PDU$_1$, that is, actual data is subjected to the decoding process in the decoder selected in the decoding section 74 (step S18) and reproduced and output to the corresponding output devices 78, 89 by means of the selected reproducing output section 76 (step S19).

That is, if it is determined by UDF that data is audio data, the audio decoder 74A is selected by the decoder selection signal and the input data is subjected to the decoding process by the audio decoder 74A. Then, the audio data is passed through the audio output section 76A selected by the reproducing output circuit selection signal and corresponding to the voice having parameters set therein and reproduced and output from the audio output device 78 such as a speaker or earphone.

Likewise, if it is determined by UDF that data is image data, the data is supplied via the image decoder 74B and image reproducing output section 76B and displayed on the display output device 80 such as a monitor, and if it is determined that data is text data, the data is supplied via the decoding section 74 as it is, converted into characters by the text reproducing output section 76C and displayed on the display output device 80.

Figure 7:
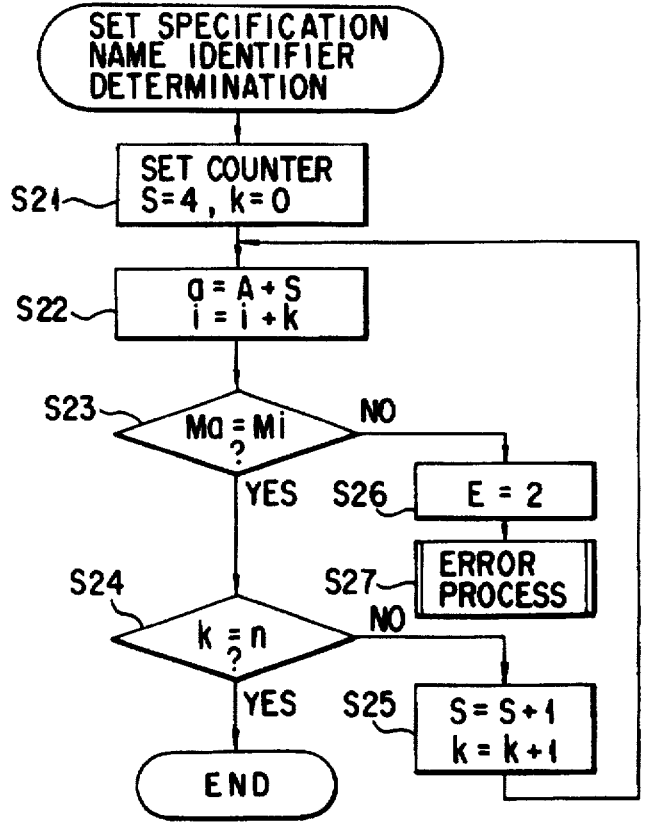
FIG. 7 is a flowchart for illustrating the set specification name identifier determining process in detail.

FIG. 7 is a flowchart for illustrating the set specification name identifier determining process in the step S16 in detail.

First, the counter S is initialized to "4" and the counter k is initialized to "0" (step S21). The reason why the counter S is set to "4" is that the next SDCH pointer 84A of the file header area 84 is set to four bytes as described before, and if it is set to six bytes, the counter S is set to "6". The counter k simply functions as a loop counter, and therefore, a value "0" is set as an initial value.

Next, a value (A+S) is set into an address counter a and a value (i+k) is set into a counter i (step S22). In this case, A indicates a head address of the file header area 84, and therefore, if the value of the counter S, in this example, "4" is added to the value of A, the content of the address counter a indicates the head address of the set specification name identifier 84B. Further, the content of the counter i indicates an address of a memory (not shown) of the set specification identifier determining section 68. That is, the memory stores patterns Mi (i=0 to n) of the set specification name identifier and the value of the address counter i indicates one byte of the pattern Mi.

The pattern Mi is constructed as "m, p, 1, 1, 0, 0, O, L, Y, S, 1, 1, 0, 0", for example. That is, the first three bytes "m, p, 1" correspond to the file specification name 84B$_1$ of the set specification name identifier 84B, the next three bytes "1, 0, 0" correspond to the file specification version 84B$_2$ of the same, and the following bytes "O, L, Y, S, 1, 1, 0, 0" correspond to the set specification name and set specification version 84B$_3$ and 84B$_4$ of 8 bytes. That is, this example indicates "mp1 version 1.00, OLYS1 version 1.00". As described before, the set specification name 84B$_3$ indicates the specification name so as to omit the necessity of referring to each SDCH if the specification value of each SDCH is determined by the individual specification. For example, the sound source, compression system and sampling rate are determined by "S1".

Of course, a plurality of patterns Mi are prepared and, for example, if the set specification name 84B$_3$ is "V1", the audio source, compression system and sampling rate are determined, if it is "I1", the image source, compression system and display size are determined, and if it is "T1", the text source and file form are determined.

After the values of the respective counters are set as described above, whether or not the pattern Ma (bytes indicated by the address a) of the set specification name identifier 84B coincides with the pattern Mi (bytes indicated by i) stored in the memory (not shown) is determined (step S23), if the former pattern coincides with the latter pattern, whether the value of the counter k has reached n or not is determined (step S24), if it is determined that it has not reached n, the values of the counters S and k are incremented by "1" (step S25), and the process returns to the step S22 to compare the next byte data. Then, if comparison for all of the bytes is completed, that is, if it is determined in the step S24 that the value of the counter k has reached n, the determining process is terminated and the next decode mode and reproducing parameter setting process is effected.

On the other hand, if it is determined in the step S23 that the former pattern does not coincide with the latter pattern, "2" is set into the error flag E (step S26) and then the error process in the step S27 is effected.

Figure 8:
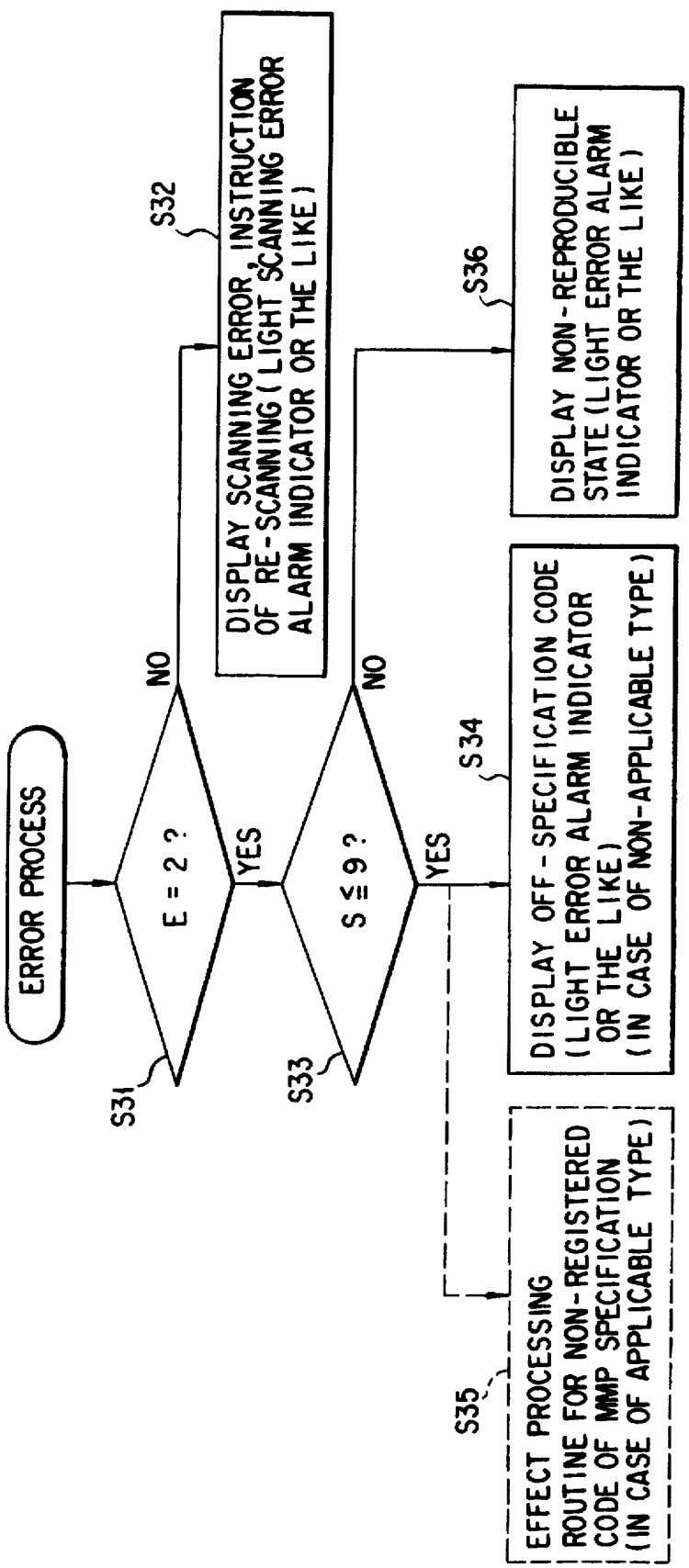
FIG. 8 is a flowchart for illustrating the error process in the first embodiment in detail.

Next, the error process effected in the steps S15 and S27 is explained with reference to the flowchart shown in FIG. 8.

The error processing section 70 first determines whether the error flag E set by the set specification identifier determining section 68 is "2" or not (step S31). In the error process in the step S15, since the error flag E is set at "1", scanning error and instruction of re-scanning are displayed (step S32). For example, when the scanning section for effecting the process in the layer 1 and the restoring section for effecting the processes of the other layers are constructed in different casings, the error information display section 72 is constructed to contain error information display sections mounted on the respective casings. Therefore, display in the case where the error flag E is set at "1" is attained by an error display information section mounted on the scanning section (not shown).

On the other hand, if the error flag E is set at "2", that is, in the case of error processing in the step S27, whether the value of the counter S is less than "9", that is, whether non-coincident byte is detected during the comparison of a portion of the file form name and file version of "m, p, 1, 1, 0, 0" which is the front half of the pattern Mi is determined (step S33).

If the value of the counter S is less than "9", two processing routines are prepared. That is, the first processing routine is used when the hardware side is not an applicable type, and in this case, the file-off-specification code is displayed (step S34). The second processing routine is used in the case of applicable type, that is, when the hardware is applicable even if the code is off-specification, and in this case, it is recognized that the code is a non-registered code of MMP specification, and a corresponding processing routine is effected to reproduce and output data in the same manner as described before (step S35). That is, even if the error flag E is set at "2", it is determined that no error has occurred and a next step is effected when the hardware is an applicable type, but the error is displayed when the hardware is not an applicable type.

On the other hand, if the value of the counter S is larger than "9", an error state is displayed in which the file specification is satisfied, that is, the specification is a correct MMP specification, but sound cannot be reproduced by the hardware by chance, for example, or image data, that is, a source which cannot be applied is given in the case of hardware exclusively used for audio reproduction. Therefore, in the above case, display of non-reproducible state corresponding to the error state is effected (step S36).

The error display in the above steps S32, S34, S36 is attained, for example, by lighting an alarm lamp of LED, displaying markers or characters by LCD, lighting a red or yellow lamp on the error information display section 72, or generating beep sound or giving warning by voice according to the type of the error, but it is possible to inform the type of error to the user by displaying the contents of the scanning error display, re-scanning instruction display, off-specification code display and non-reproducible display in different manners, for example, by lighting the red lamp for the scanning error, lighting the yellow lamp for the off-specification code.

Figure 9:
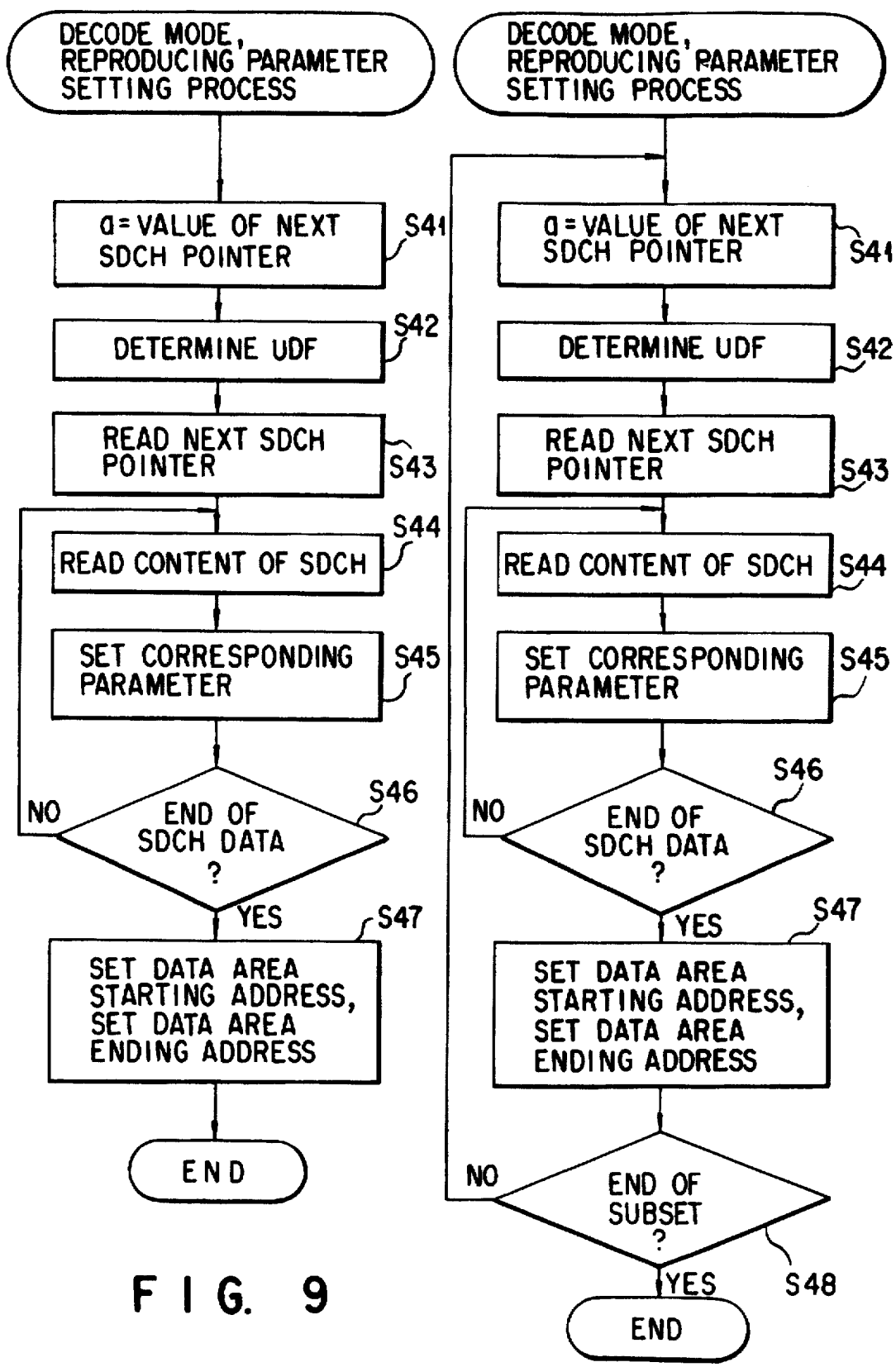
FIG. 9 is a flowchart for illustrating the decode mode and the reproducing parameter setting process in the first embodiment in detail.

Next, the decode mode and reproducing parameter setting process in the step S17 is explained with reference to the flowchart of FIG. 9.

First, the set specification identifier determining section 68 sets the value of the next SDCH pointer 84A of the file header area 84 into the address counter a (step S41), reads UDF lying in the address, for example, UDF $82_{11}a$ of the subset header area $82_1$, determines the media, for example, voice, outputs a decoder selection signal to the decoding section 74 so as to select the audio decoder 74A, and outputs a reproducing output circuit selection signal to the reproducing output section 76 so as to select the audio reproducing output section 76A (step S42). Then, it reads the content of the next SDCH pointer $82_{11}b$ of the next address (in this case, "$FF_H$" indicating that no SDCH is present is set) (step S43).

After this, the content of SDCH, that is, the parameter $82_{11}c$ is read (step S44) and the parameter is set (step S45). That is, the parameter setting is effected by the reproducing output circuit selection signal. Then, whether the reading of SDCH data, that is, parameter $82_{11}c$ is completed or not is determined (step S46), and if it is not yet completed, the step S44 is effected again and the process of reading the next parameter is repeated. That is, since it is already determined that data is audio data by the UDF $82_{11}a$ and the address range of the parameter $82_{11}c$ is determined by the specification in the case of audio data, whether the reading of the parameter is completed or not can be determined by determining the address.

Then, when all of the parameters are set, the data area starting address $82_{11}d$ and data area ending address $82_{11}e$ for the corresponding data area $88_{1}a$ are read and stored into a memory (not shown) (step S47).

[Second Embodiment]

Figure 10:
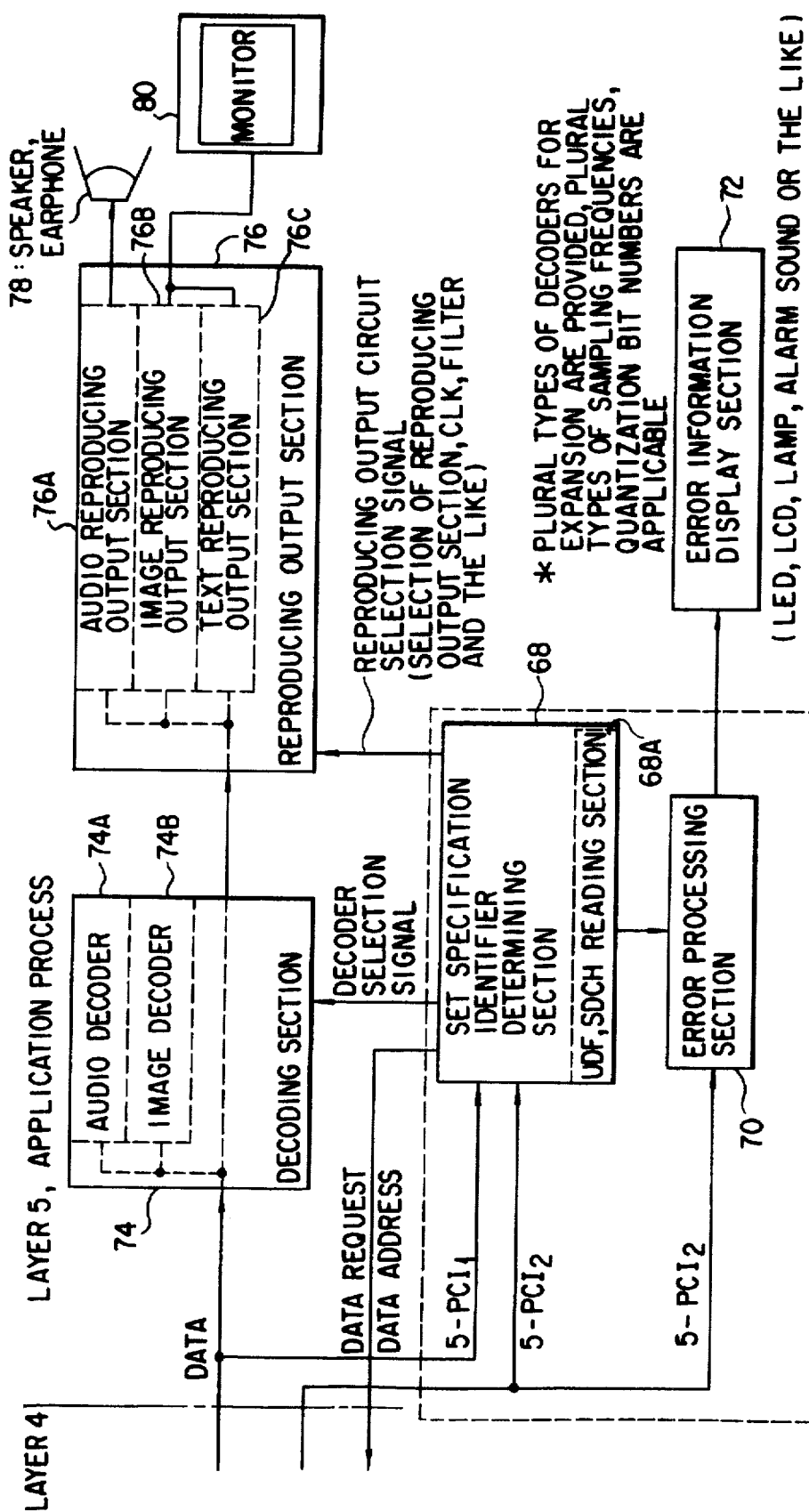
FIG. 10 is a block construction diagram showing the layer 5 and the application process in the second embodiment.
Figure 11:
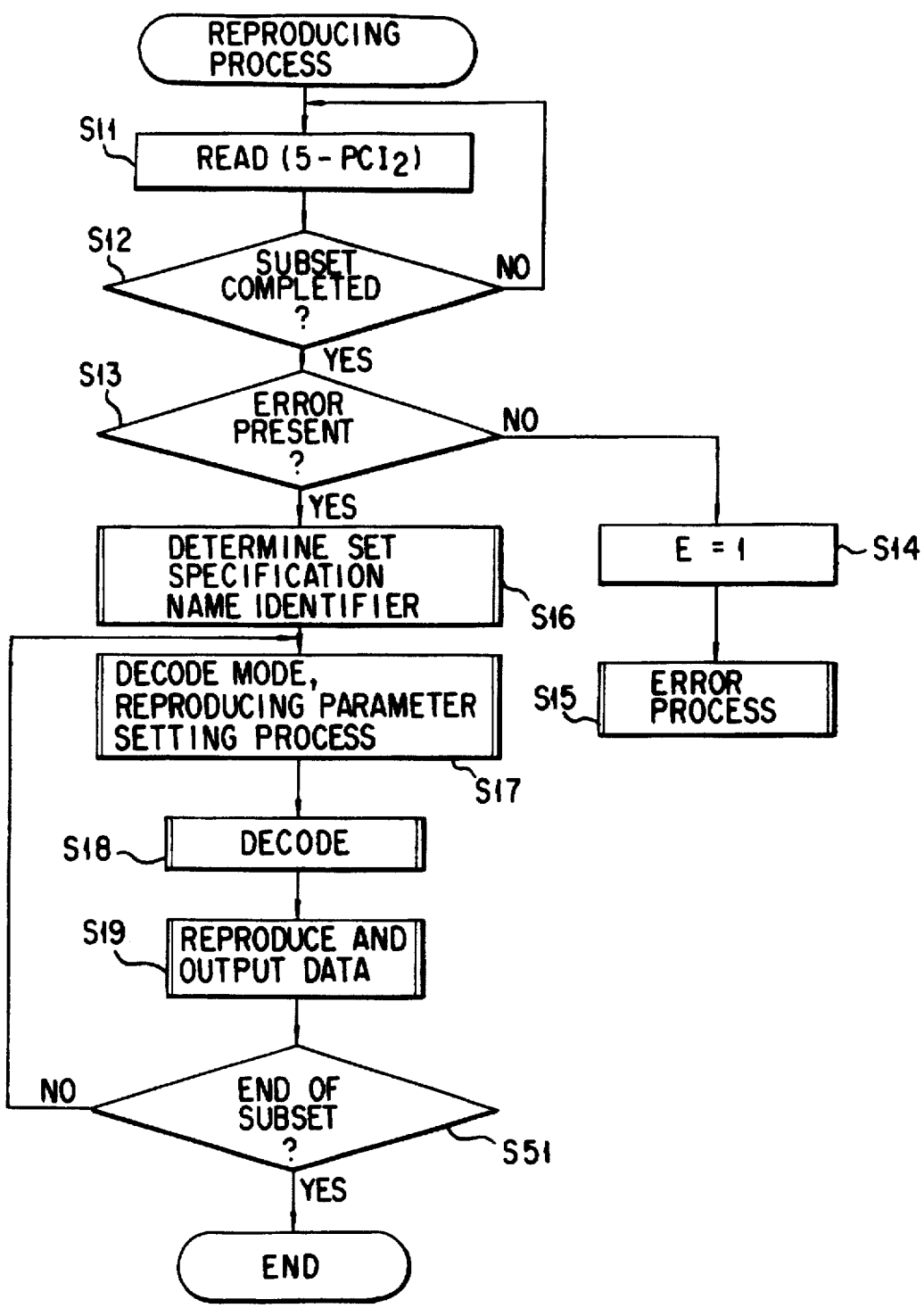
FIG. 11 is a flowchart for illustrating the operation of the reproducing process in the second embodiment.

FIGS. 10 and 11 are diagrams showing the construction of the second embodiment of this invention and the flowchart of the reproducing process and portions which are the same as those of FIGS. 4 and 6 are denoted by the same reference numerals.

The construction of this embodiment is different from the construction of the first embodiment in that the set specification identifier determining section 68 includes UDF, SDCH reading section 68A for reading the UDF and SDCH.

Figure 5:
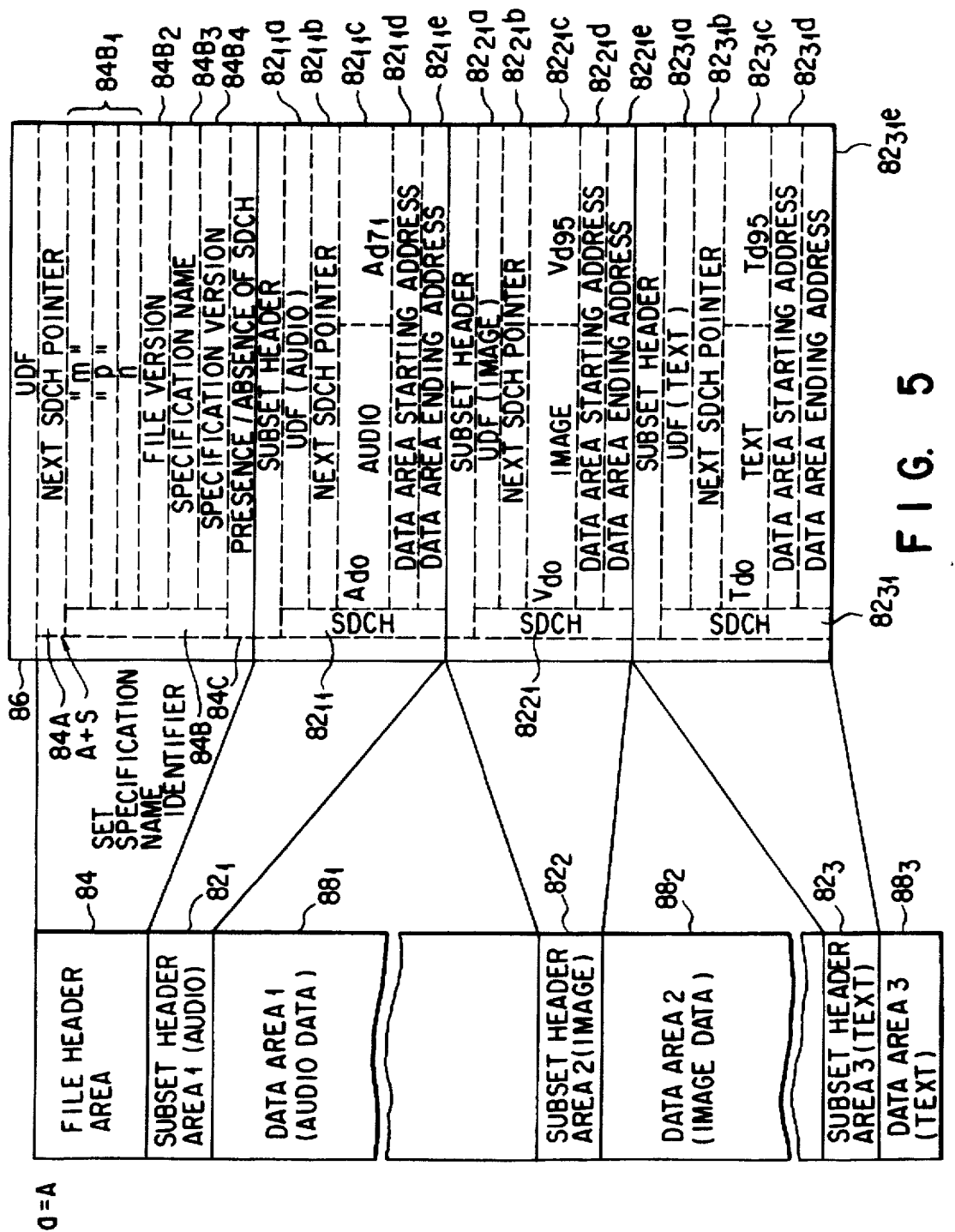
FIG. 5 is a diagram showing an example of the file structure of a subset supplied from the layer 4.

Further, the file structure in which a plurality of subsets are successively arranged and a file header area 84 is arranged only in front of the first subset as shown in FIG. 5 is transferred from the layer 4.

Therefore, in the reproducing process, the UDF, SDCH reading section 68A of the set specification identifier determining section 68 does not terminate the process after one subset is reproduced and output in the step S19, but determines whether the reproducing process for all of the subsets is completed or not (step S51), and if it is not yet completed, the step S17 is effected again and the reproducing process for the next subset data is effected. That is, in the example shown in FIG. 5, audio data is first reproduced, image data is next reproduced and then text data is reproduced. In this case, whether the reproducing process for all of the subsets is completed or not is determined by checking the values of the next SDCH pointers $82_{11}b$, $82_{21}b$, $82_{31}b$ and the determination is made according to whether it is an end code such as "$FF_H$" or not.

[Third Embodiment]

Figure 12:
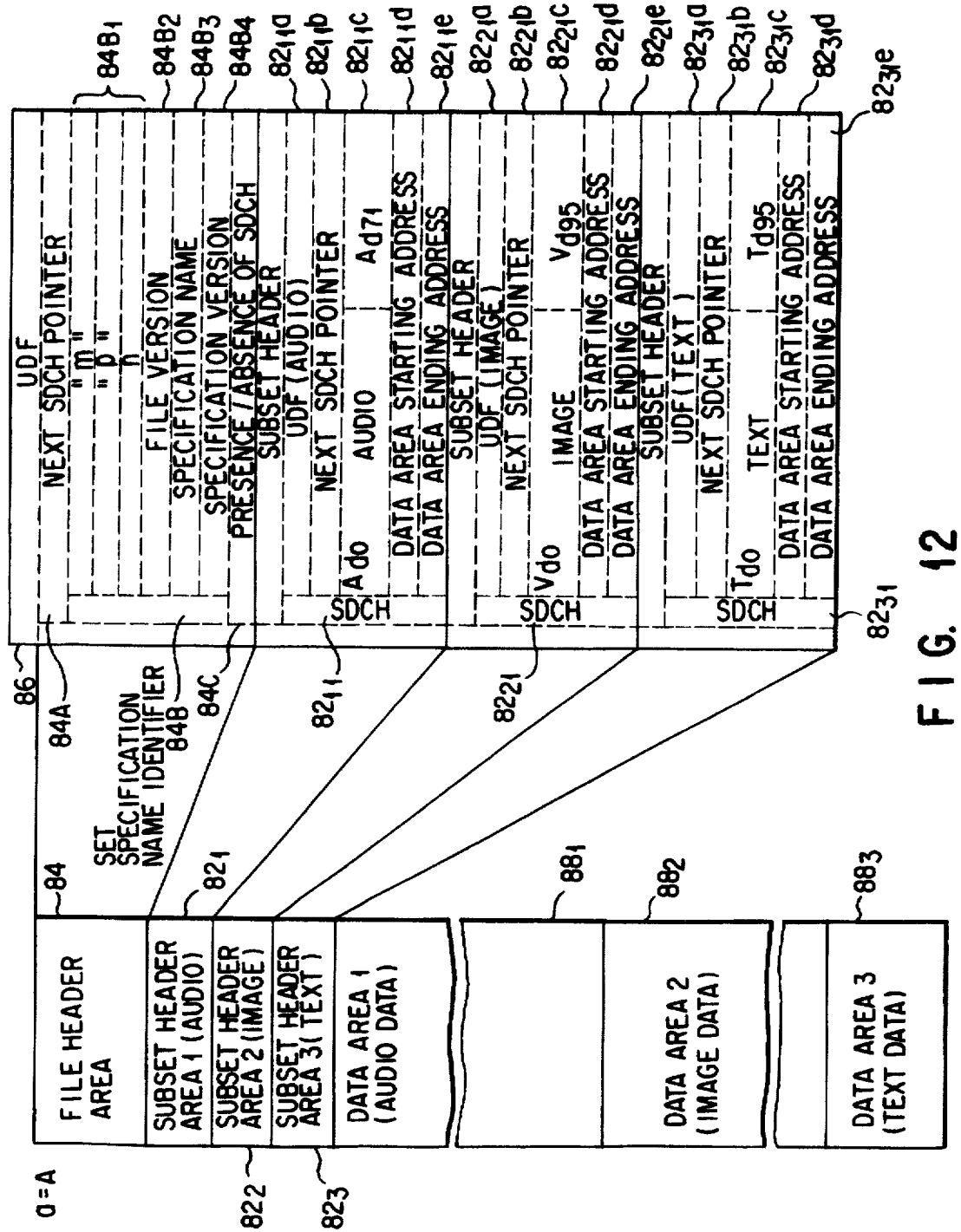
FIG. 12 is a diagram showing an example of the file structure of a subset supplied from the layer 4 in the third embodiment.

FIG. 12 is a diagram showing the file structure in the third embodiment of this invention and portions which are the same as those of FIG. 5 are denoted by the same reference numerals.

In the file structure of FIG. 5, one subset header is attached to each subset, but since data starting addresses $82_{11}d$, $82_{21}d$, $82_{31}d$ and ending addresses $82_{11}e$, $82_{21}e$, $82_{31}e$ are respectively provided in the subset header areas $82_1$, $82_2$, $82_3$ for corresponding data areas $84_1$, $84_2$, $84_3$, it is not necessary to successively arrange the header areas $82_1$, $82_2$, $82_3$ and the data areas $84_1$, $84_2$, $84_3$, and it is possible to collectively arrange the subset header areas $82_1$, $82_2$, $82_3$ as shown in FIG. 12.

The flowchart for the reproducing process is the same as that of FIG. 11 of the second embodiment. However, in this embodiment, the UDF, SDCH reading section 68A of the set specification identifier determining section 68 collectively reads the subset header areas $82_1$, $82_2$, $82_3$ in the set specification name identifier determining process of the step S16. Then, in the decode mode, reproducing parameter setting process of the step S17, the process of selecting the decoder 74A, 74B and reproducing output section 76A, 76B, 76C and setting parameters is effected.

Of course, the parameter setting process may be effected to collectively set the parameters at the first time. That is, as shown in FIG. 13, the value of the next SDCH pointer 84A of the file header area 84 is set into the address counter a (step S41), UDF lying in the address is read and the content thereof is stored into a memory (not shown) (step S42), and then the content of the next SDCH pointer $82_{11}b$ is read (step S43). After this, the content of the SDCH, that is, the parameter is read (step S44), and the parameter is set into a corresponding reproducing output section (step S45). Then, whether reading of SDCH data, that is, parameter is completed or not is determined (step S46), and if it is not yet completed, the step S44 is effected again and the process of reading the next parameter is repeated. When setting of all of the parameters is completed, a data area starting address and data area ending address for a corresponding data area are read and stored into a memory (not shown) (step S47). Then, whether the reproducing process for all of the subsets is completed or not is determined (step S48), and if it is not yet completed, the step S41 is effected again and the process of storing UDF of the subset and address and setting parameters is repeated.

In the third embodiment, the program for the controller 66 can be simplified.

[Fourth Embodiment]

Figure 14:
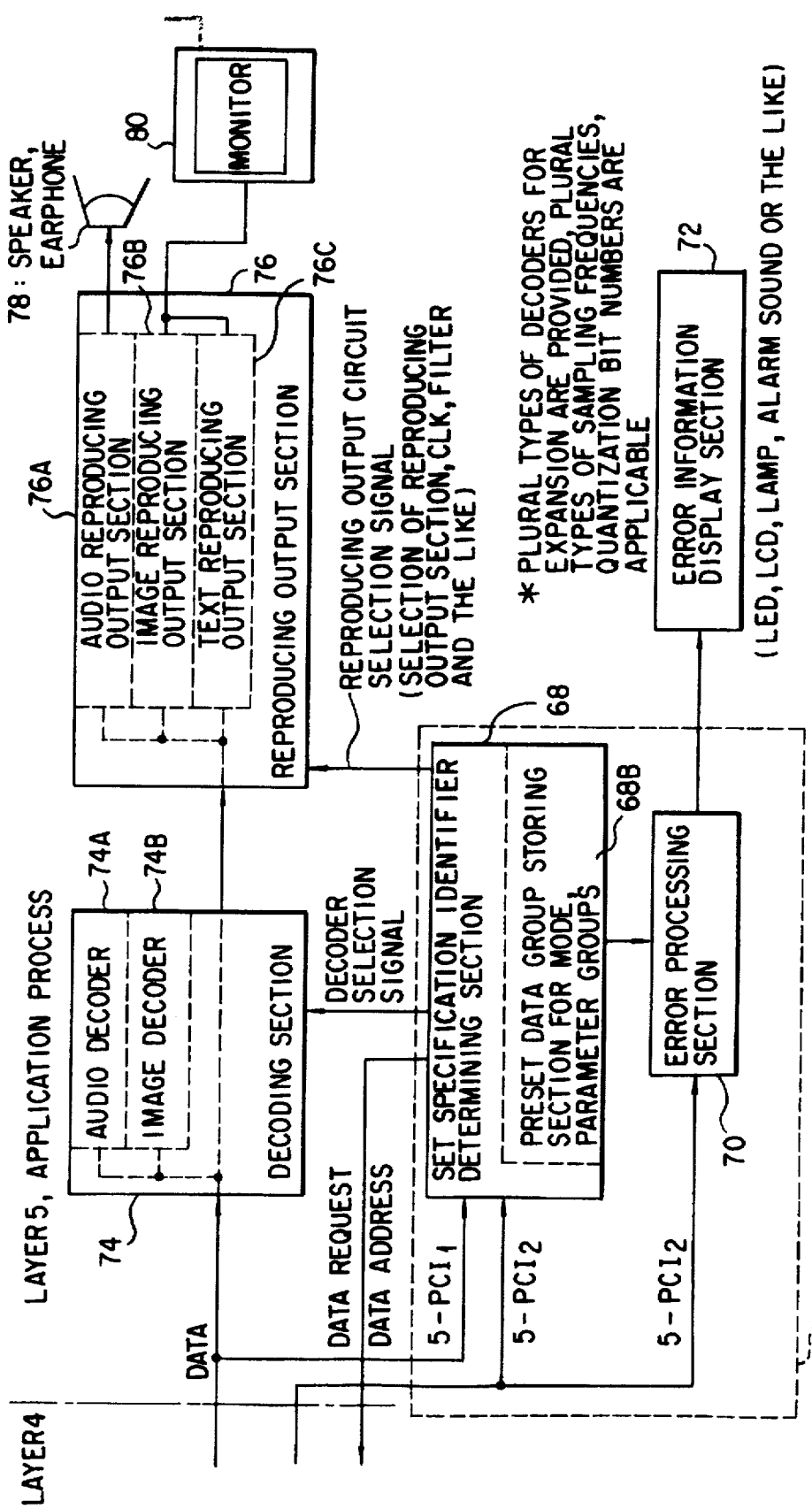
FIG. 14 is a block construction diagram showing the layer 5 and the application process in the fourth embodiment.

FIG. 14 is a diagram showing the construction of the fourth embodiment of this invention and portions which are the same as those of FIG. 4 are denoted by the same reference numerals.

The construction of this embodiment is different from the construction of the first embodiment in that the set specification identifier determining section 68 includes a preset data group storing section 68B for mode and parameter groups in which stores a plurality of mode groups and parameter groups.

In this embodiment, not only the process of determining the reproducible code but also the process of specifying the selection of the parameter is effected in the set specification name identifier determining process. That is, modes or parameters specified by the result of determination in the set specification name identifier 84B can be collectively selected from the mode group or parameter group previously stored in the preset data group storing section 68B for the mode and parameter groups.

Therefore, in this embodiment, it becomes unnecessary to read all of the parameters one by one in the decode mode and reproducing parameter setting process in the step S17 and it becomes possible to skip the step S17 and effect the process up to the decoding process of the step S18, thereby making it possible to reduce the reproducing time.

Figure 15:
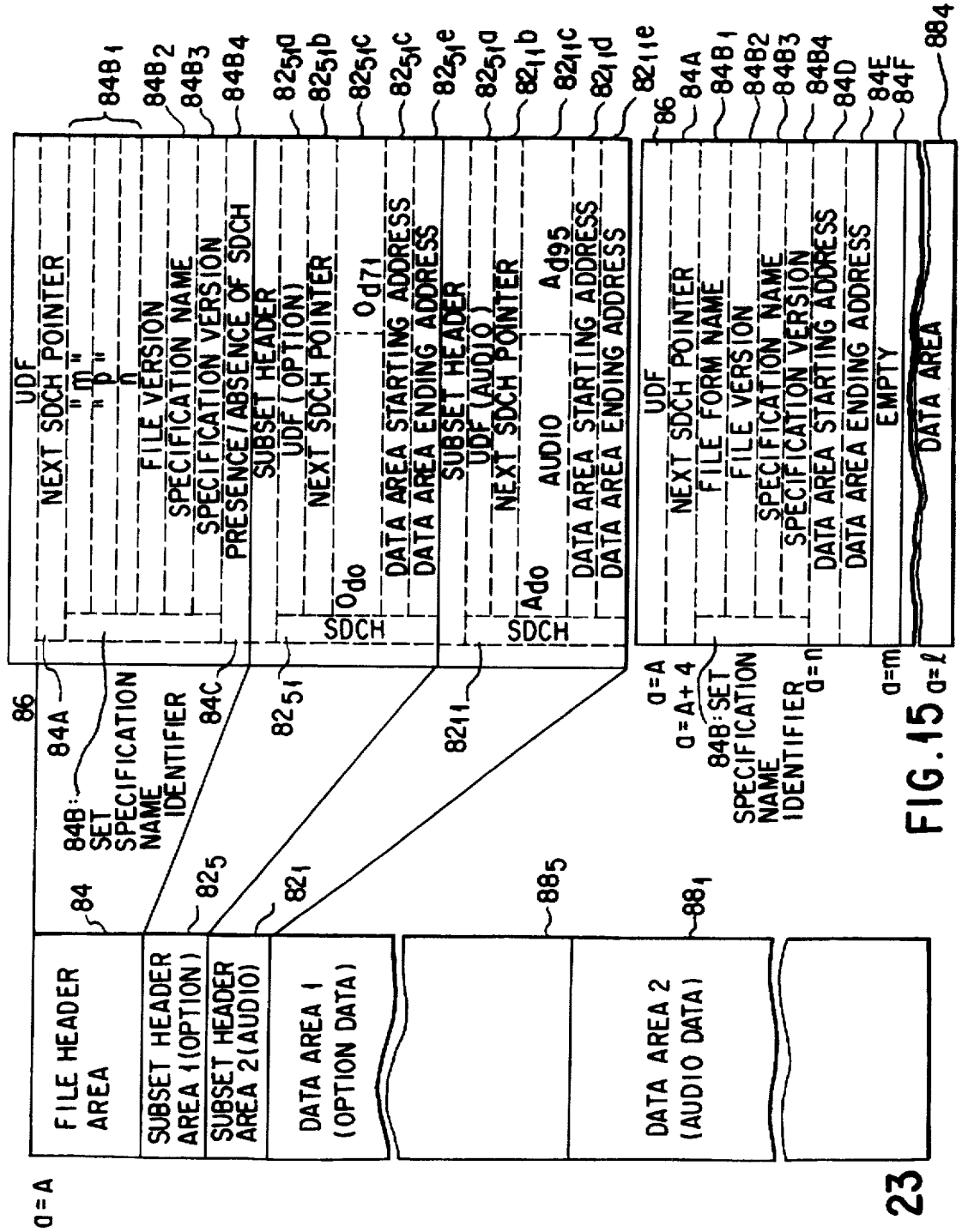
FIG. 15 is a diagram showing the file structure of a subset supplied from the layer 4 in the fourth embodiment.

Further, since selection of the decoding section 74 and reproducing output section 76 and setting of parameters can be instantly attained only by use of the subset specification name identifier 84B of the file header area 84 without describing the UDF and reproducing parameters in the subset header area in some cases, the size of the subset header area can be reduced accordingly and the actual data area can be enlarged. That is, as shown in FIG. 15, the data area $88_4$ can be arranged immediately after the file header area 84 with the subset header area omitted. However, in this case, a starting address 84D and ending address 84E of the data area $88_4$ are set in addition to the next SDCH pointer ("$FF_H$") 84A and set specification name identifier 84B in the file header area 84 (a reference numeral 84F denotes a space area).

[Fifth Embodiment]

Further, in a case where a plurality of subsets are provided, the fourth embodiment can be modified in the same manner as the manner in which the first embodiment is modified into the second embodiment.

However, in this case, the number of subsets is counted in the set specification name identifier determining process of the step S16 of FIG. 11, the number is counted down each time the reproducing output process for one subset is terminated in the step S19, and when the process returns from the step S51 to the step S17, selection of the decoding section 74 and reproducing output section 76 is effected according to the counted value.

Therefore, the process of decoding actual data information of a next subset can be immediately started without reading header information of the next subset, and the process can be simplified and the processing time can be reduced.

[Sixth Embodiment]

Next, the sixth embodiment of this invention is explained.

The first to fifth embodiments are examples in which multimedia information including audio data, image data and text data is dealt with, but this embodiment is a case of application in which only audio information among the above information is dealt with.

Figure 16:
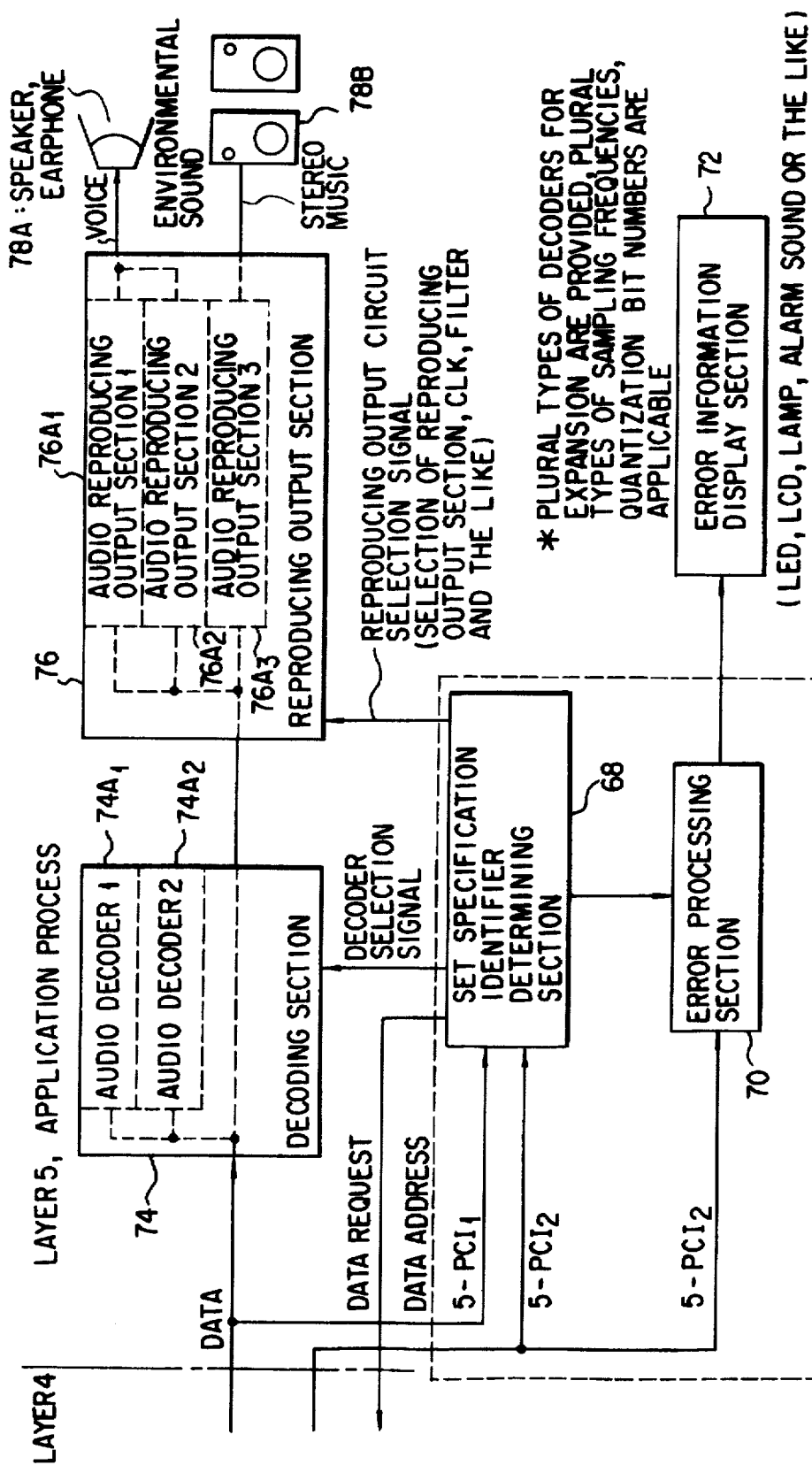
FIG. 16 is a block construction diagram showing the layer 5 and the application process in the sixth embodiment.

FIG. 16 is a diagram showing the construction thereof and is basically the same as the construction of FIG. 4. However, in this embodiment, the decoding section 74 includes a plurality of audio decoders $74A_1$, $74A_2$, and the reproducing output section 76 includes a plurality of audio reproducing output sections $76A_1$, $76A_2$, $76A_3$. That is, if the information is limited to audio information, a plurality of audio decoders $74A_1$, $74A_2$ are provided since audio information includes musical sounds and languages by voice and the compressing and expanding processes for them are provided. Further, in order to cope with this, the reproducing output section 76 is also subdivided according to the voice, environmental sound, and stereo music and the parameters are provided such that the clock and filter characteristic can be adequately selected. Further, in the audio output device 78, the speaker or earphone 78A and stereo speaker 78B can be adequately and selectively used according to the voice, environmental sound or stereo music.

The reproducing process is basically the same as that of the first embodiment shown in FIG. 6. However, in the set specification name identifier determining process of the step S16, whether data is a reproducible code or not is determined in the first embodiment, but attribute information of the source such as audio information and image information is not determined. On the other hand, in this embodiment, in the set specification name identifier determining process, attribute information of the source is also determined and whether data is an audio code or not is determined, and if the data is an audio code, the process is permitted to proceed to the next step.

[Seventh Embodiment]

Figure 17:
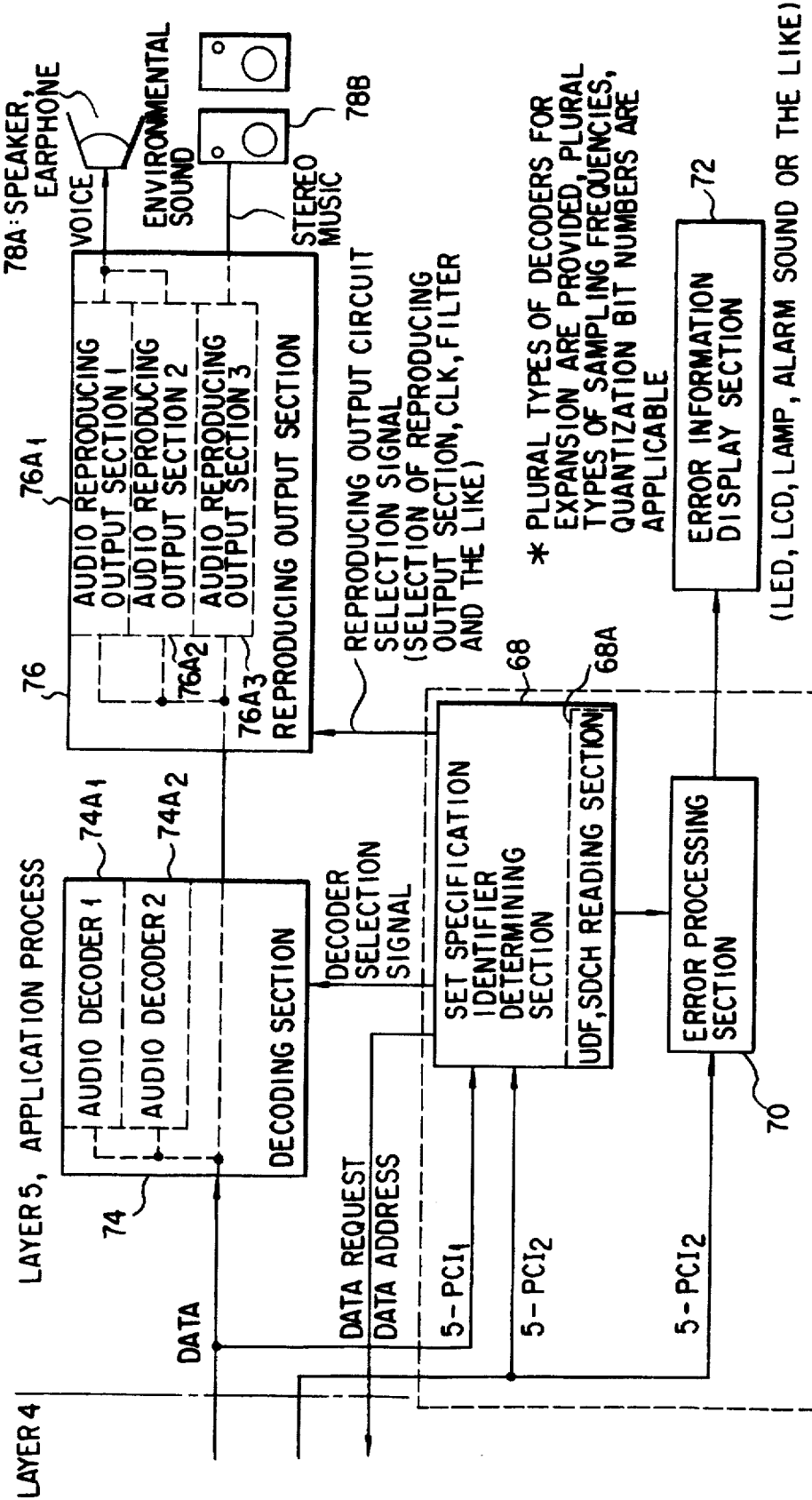
FIG. 17 is a block construction diagram showing the layer 5 and the application process in the seventh embodiment.

FIG. 17 is a diagram showing the construction of the seventh embodiment which is obtained by modifying the sixth embodiment in the same manner as that in which the first embodiment is modified into the second embodiment.

That is, in this embodiment, in a case where a plurality of subsets of the same source type are provided or where a plurality of subsets of different source types such as languages and music are provided, reproduction is effected at any time until reproduction for all of the subsets is completed.

Like the second embodiment, this embodiment has UDF, SDCH reading section 68A as hardware and selects the reproduction. Further, completion of the reproducing process for all of the subsets is determined according to whether the next SDCH pointer is "$FF_H$" or not.

[Eighth Embodiment]

Figure 18:
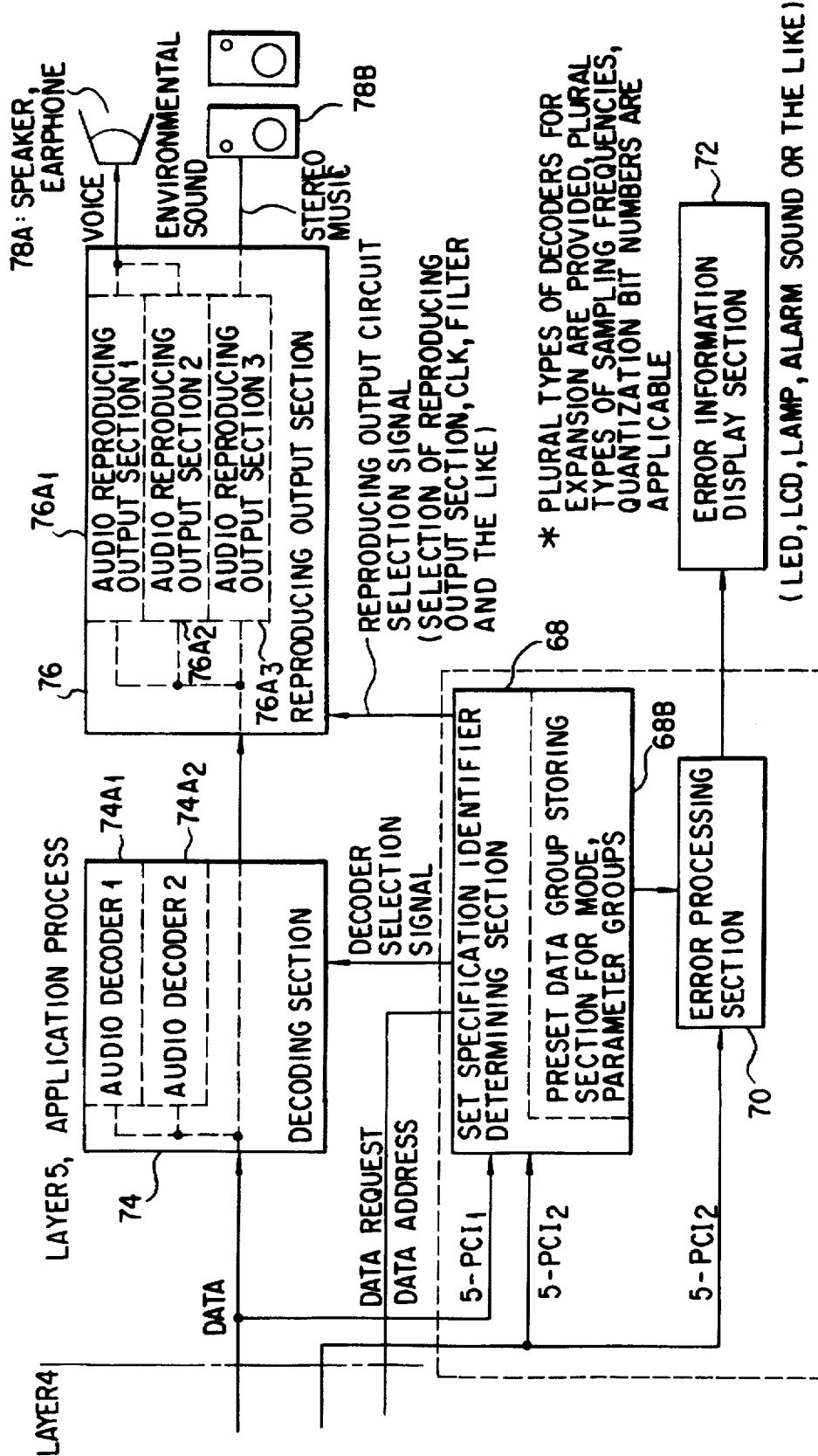
FIG. 18 is a block construction diagram showing the layer 5 and the application process in the eighth embodiment.

FIG. 18 is a diagram showing the construction of the eighth embodiment which is obtained by modifying the sixth embodiment in the same manner as that in which the first embodiment is modified into the fourth embodiment.

That is, in the set specification identifier determining section 68, a preset data group storing section 68B for storing mode groups and parameter groups are prepared in a program ROM area or the like. That is, after the set specification name identifier determining process is effected, all of the corresponding parameters are collectively recognized by use of the set specification name identifier, immediately set, and then decoded, reproduced and output in an adequate form.

Like the fourth embodiment, in this embodiment, since it is unnecessary to read all of the parameters contained in SDCH one by one, the reproducing time can be reduced accordingly and the high-speed process can be attained.

[Ninth Embodiment]

The eight embodiment can be modified in the same manner as that in which the fourth embodiment is modified into the fifth embodiment.

[Tenth Embodiment]

Figure 19:
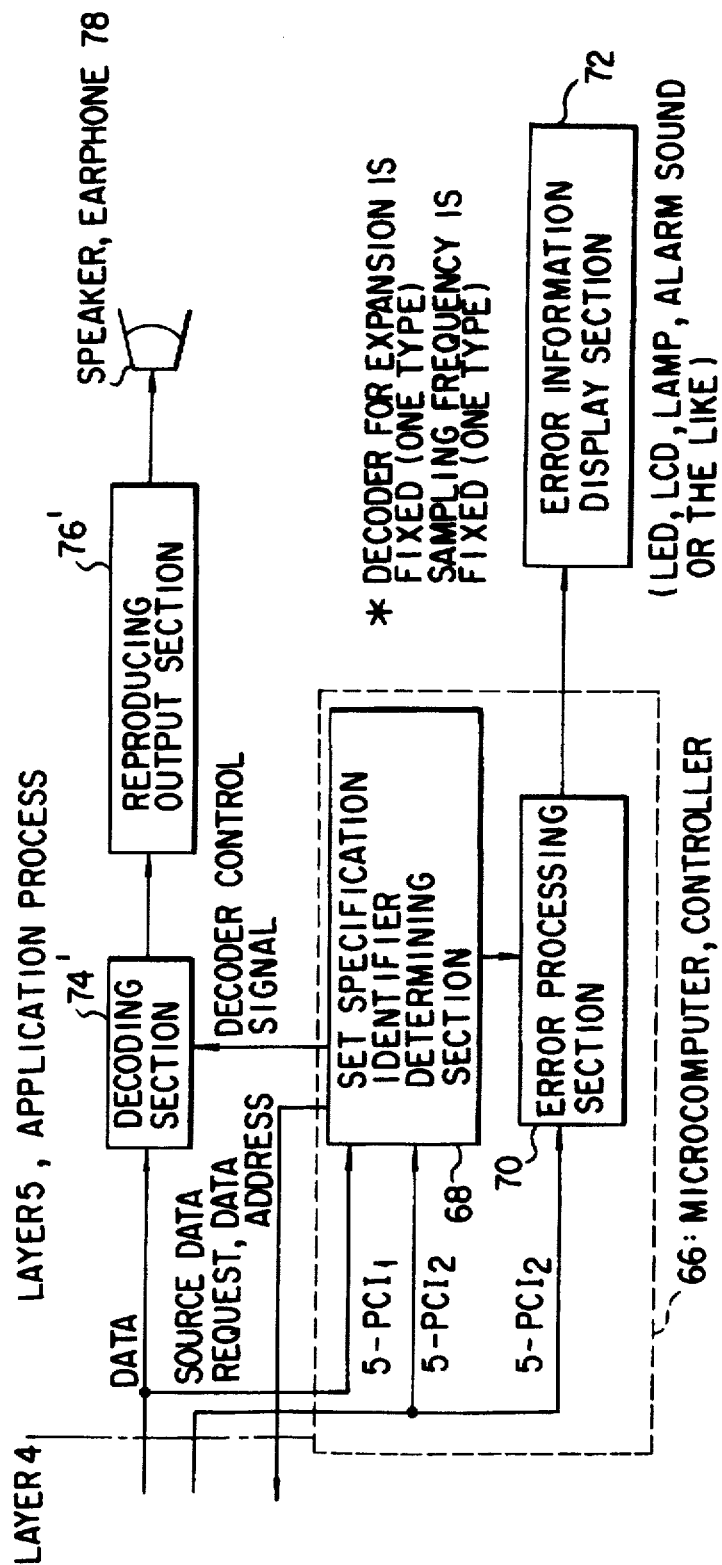
FIG. 19 is a block construction diagram showing the layer 5 and the application process in the tenth embodiment.

FIG. 19 is a diagram showing the construction of the tenth embodiment.

In the sixth to ninth embodiments, the decoding sections and reproducing output processing sections are selected according to plural types of compression/expansion systems and sources, although they are exclusively used for audio reproduction, but this embodiment is an example of a low-cost device having a decoding section 74' specified for one compression/expansion system and a reproducing output section 76' specified for one source. That is, if the device is used for English conversation, for example, the decoding section 74' is constructed in hardware to have a compression/expansion system such as DODCELP or LMCELP in which languages are characterized or a compression system such as psi-CELP, and the reproducing output section 76' is constructed in hardware to have a clock rate and filter characteristic corresponding to a sampling rate since the human voice can be sufficiently reproduced by the sampling rate of 8 kHz in the case of languages.

Figures 20, 22:
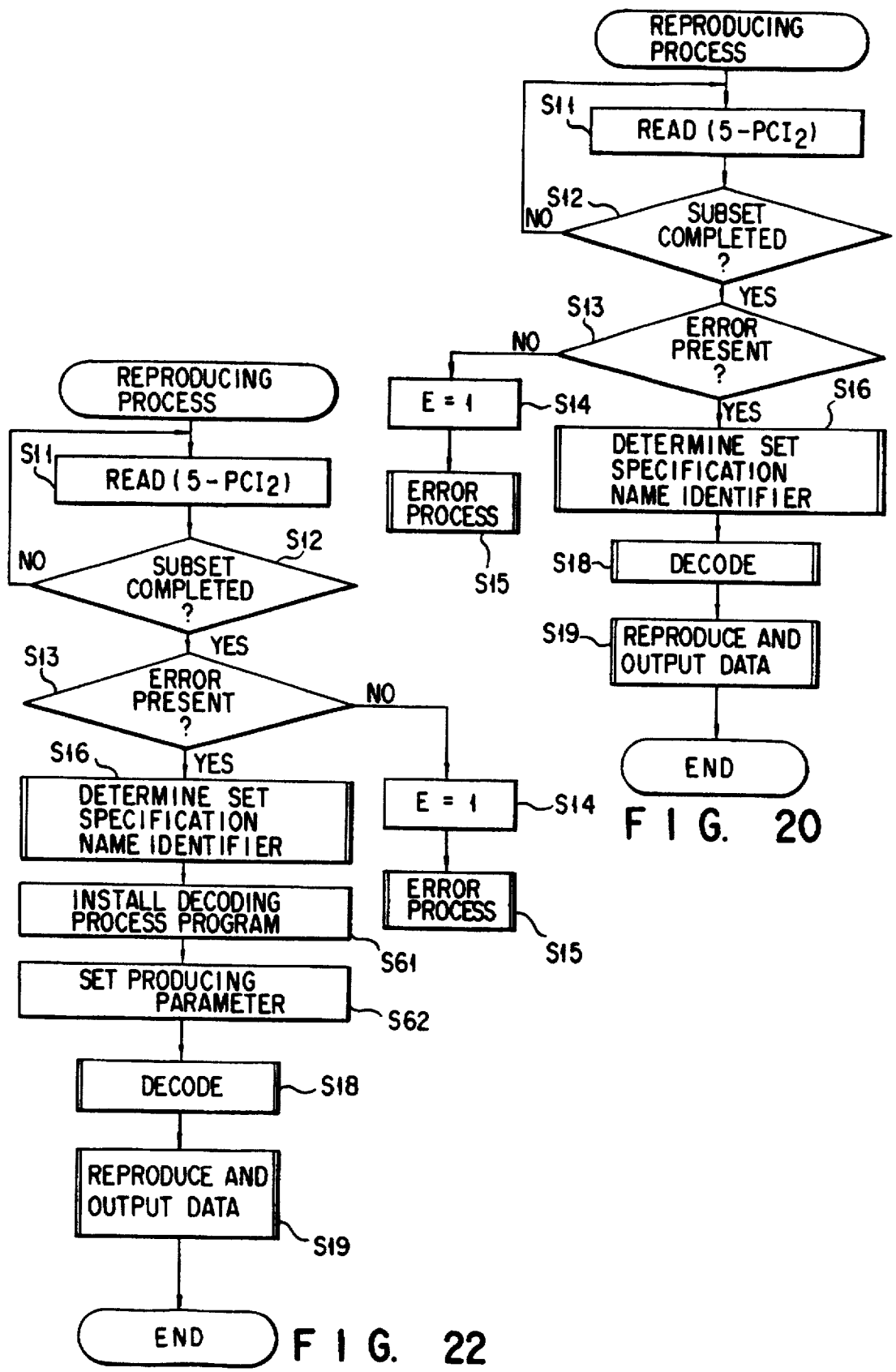
FIG. 20 is a flowchart for illustrating the operation of the reproducing process in the tenth embodiment.
FIG. 22 is a flowchart for illustrating the operation of the reproducing process in the eleventh embodiment.

As shown in the flowchart of FIG. 20, in the reproducing process, the set specification identifier determining section 68 reads 5-$PCI_2$ (step S11), and effects the determining process of the set specification name identifier 84B of the file header area 84 (step S16) if it is determined that necessary subsets are collected (step S12) and no error is detected (step S13). In this embodiment, the above process is effected by determining whether or not the set specification name identifier 84B coincides with an applicable set specification name identifier pattern of this device.

Only when the set specification name identifier 84B coincides with the applicable set specification name identifier pattern, the decoding section 74' and reproducing output section 76' are permitted to effect the decoding process (step S18) for actual data of the subset and reproducing output process (step S19) therefor.

Further, if no coincidence is detected, the error process is immediately started and an error message indicating that reproduction cannot be effected in this device is displayed on the error information display section 72.

In this embodiment, since it is unnecessary to provide a selecting section, switching section, a plurality of decoders and a plurality of reproducing output sections, the construction is made simple in hardware and the cost can be lowered. Further, since the decoding and reproducing output processes can be immediately started by determining whether the set specification name identifier is coincident or not, the reproducing process can be effected at extremely high speed.

[Eleventh Embodiment]

FIG. 21 is a diagram showing the construction of the eleventh embodiment.

Like the tenth embodiment, this embodiment is an example of a device exclusively used for audio reproduction, but this device is not specified to only one compression/expansion system and has a program RAM 90 for storing a decoding process program, and a decoding section 92 for effecting the actual decoding process according to the decoding process program so as to cope with various types of compression/expansion systems. In this case, the program RAM 90 stores the decoding process program according to a decoding program data install signal from the set specification identifier determining section 68. The decoding process program is transferred from the layer 4.

FIG. 22 is a flowchart for illustrating the operation of the reproducing process of this embodiment, and the set specification identifier determining section 68 first reads 5-$PCI_2$ which is a status signal (step S11), determines whether necessary subsets are collected (step S12), and determines whether any error has occurred or not (step S13). If an error has occurred, the error flag E is set to "1" (step S14), and then the error process is started (step S15). If no error has occurred, the set specification identifier determining section 68 effects the process of determining the set specification name identifier 84B of the file header 84 among 5-$PCI_1$ (step S16).

After this, the decoding process program is installed into the program RAM 90 (step S61). In this embodiment, the file structure transferred from the layer 4 has a data area $88_5$ for option data in addition to a data area $88_1$ for audio data as a data area as shown in FIG. 23, and the decoding process program is described in the option data area $88_5$. Therefore, the set specification identifier determining section 68 reads SDCH in the subset header area of the option data area $88_5$, outputs a decoding program data install signal to the program RAM 90 according to the readout SDCH, and then installs data of the option data area $88_5$ into the program RAM 90.

SDCH $82_{S1}$ of the subset header area $82_5$ for option data includes UDF $82_{S1}a$, next SDCH pointer $82_{S1}b$, parameter $82_{S1}c$, data area starting and ending addresses $82_{S1}d$ and $82_{S1}e$. In this case, as the parameter $82_{S1}c$, the following information items are inserted, for example.

$O_{d0}$ to $O_{d39}$: option specification name and version;

$O_{d40}$ to $O_{d47}$: version-up/temporary measure/function adding code;

$O_{d48}$ to $O_{d70}$: reservation;

$O_{d71}$: corresponding DSP, microcomputer code.

For example, if $O_{d1}=1$, it indicates a de-scrambling table and password, if $O_{d2}=1$, it indicates an SDSP program, if $O_{d2}=0$, it indicates a microcomputer program, and $O_{d3}$ to $O_{d7}$ are spares. Further, if $O_{d40}=1$, it indicates control program version-up (rewriting), and if $O_{d40}=0$, it indicates a temporarily adaptable program to reading MMP code data (for example, installing an expansion program of corresponding compression system together with audio data into the device:addition).

If the decoding process program install is thus effected, the process of selecting the reproducing output section 76 and setting the parameter is next effected (step S62). After this, data of the data area $88_1$, that is, actual data is decoded by the decoding section 92 (step S18). In this case, the decoding section 92 effects the decoding process according to the decoding program installed in the program RAM 90. That is, for example, the decoding process in the decoding section 92 is determined only when the decoding program for specifying the compression/expansion system such as DODCELP is installed in the program RAM 90 and the thus determined decoding process is effected. Then, decoded data is reproduced and output to the output device 78 by the selected reproducing output section 76 (step S19).

By the above reproducing process with the above construction, it becomes possible to cope with a plurality of reproducing codes simply by preparing the program RAM 90 without preparing a plurality of decoders. That is, a large extent of expansion of functions can be attained with the least sufficient hardware.

Further, it is possible to additionally describe a control program or the like of the controller 66, for example, in addition to the expansion algorithm program such as the above audio data in the option data area $88_5$. That is, in a case where some modification of version is made in a portion of the layer 4 or the lower layer with which the microcomputer is associated, the version-up of the hardware of the application process and the layer 5 can be attained if the content of modification is described in the option data area $88_5$.

Further, in FIG. 23, a case wherein all of the header areas are collectively arranged in front of the option data area $88_5$ is shown, but it is of course possible to arrange the subset header area $82_1$ for audio data in front of the audio data area $88_1$.

[Twelfth Embodiment]

Figure 24:
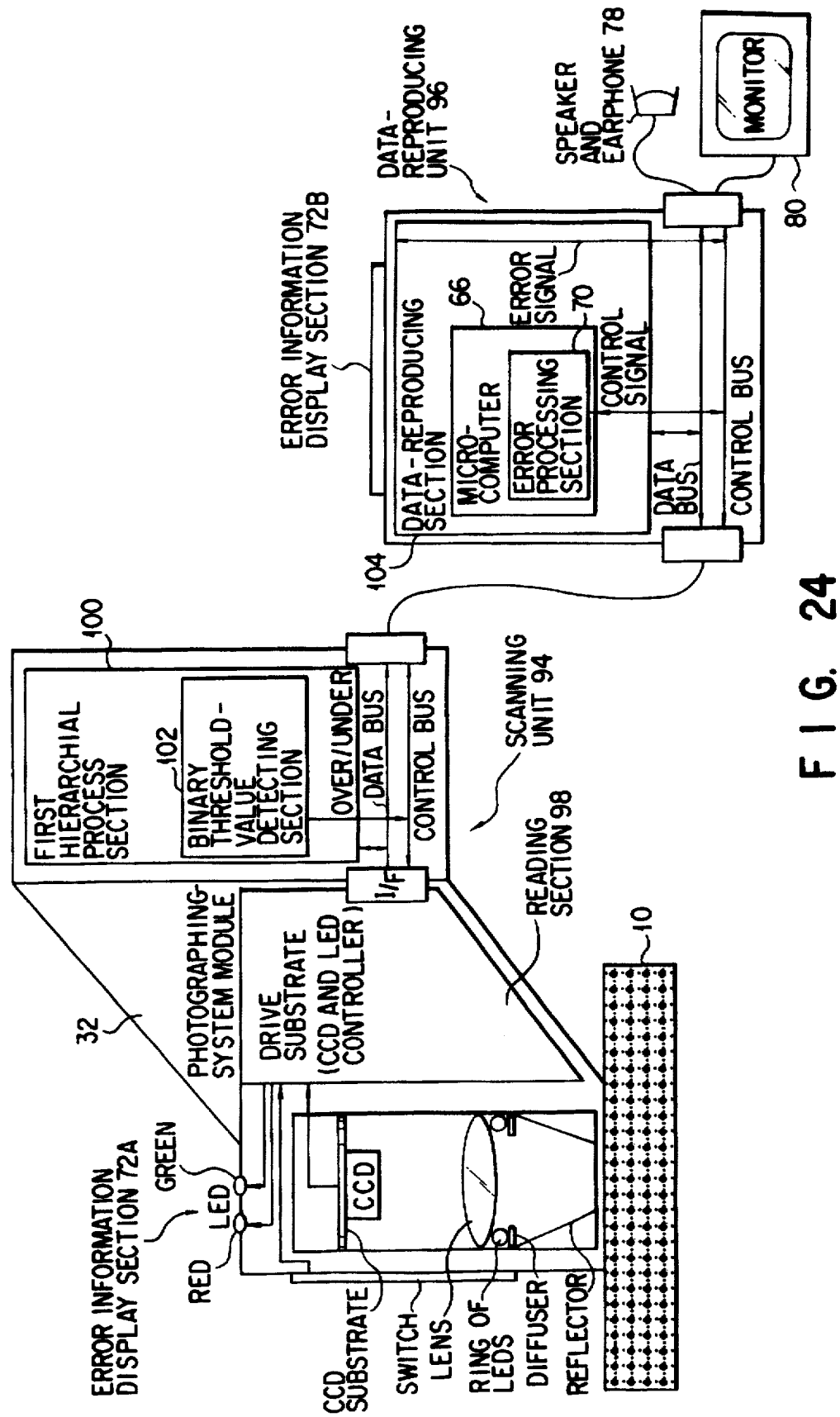
FIG. 24 is a diagram showing a twelfth embodiment of the present invention.

FIG. 24 shows the twelfth embodiment of the invention, comprising a scanning unit 94 and a data-reproducing unit 96 which are connected by a cable. The scanning unit 94 is designed to optically read dot codes. The data-reproducing unit 96 is designed to process the dot code thereby to reproduce multimedia information.

The scanning unit 94 has an error information display section 72A, which displays scanning errors and data-processing errors made in the scanning unit 94. Similarly, the data-reproducing unit 96 has an error information display section 72B which displays errors made in the data-reproducing process performed in the data-reproducing unit 96.

The scanning unit 94 further comprises a reading section 98 and a first hierarchial process section 100. The reading section 98 corresponds to the photographing-system module 32 of layer 1, which comprises a light source, an optical system, a CCD and the like. The first hierarchial process section 100 includes a reproduction equalizing module 34, a quantization module 36 and the like and is designed to convert dot codes read by the CCD, into binary data. The reading section 98 and first hierarchial process section 100 are connected by two buses and an interface (I/F). The first bus is a data bus to transmit the dot code data, and the second bus is a control bus to transmit error signals and control signals.

The first hierarchial process section 100 has a binary threshold-value detecting section 102. The section generates a over/under-exposure signal. This signal, which indicates an error, is supplied through the control bus to the error information display section 72A. Upon receipt of the signal, the section 72A causes a red LED to emit red light, indicating a scanning error has been made.

The data-reproducing unit 96 further comprises a data-reproducing section 104. The section 104 is designed to process not only the layers 2 to 5 and the application process layer. The section 104 has two buses, i.e., a data bus and a control bus. The section 104 incorporates a microcomputer 66, which controls any other component of the section 104. The microcomputer 66 has the error processing section 70 which processes error signals.

The error processing section 70 supplies an error signal to the error information display section 72B. The section 72B displays the error represented by the error signal. The error signal is supplied to the error information display section 72A of the scanning unit 94, too, through the control bus and the interface (I/F). Thus, the section 72A display the error represented by the error signal.

The error information display section 72A of the scanning section 94 has a green LED, besides the red LED. The error information display section 72B of the data-reproducing unit 96 has a liquid crystal display for displaying various messages in words and symbols.

FIG. 25A shows items of information which are displayed by the error information display section 72A incorporated in the scanning section 94. Basically, while the scanning section 94 is operating well, the green LED is turned on. When the section 94 makes an error, the red LED is turned on. Further, both LED can blink. Thus, when used in combination, the green LED and the red LED can indicate nine different operating conditions of the section 96, in accordance with whether thy are turned on or off.

FIG. 25B shows items of information which are displayed by the error information display section 72B incorporated in the data-reproducing section 96. The the section 72B has nine display units arranged in three rows and three columns, each for displaying a message in words or a symbol. The nine messages the section 72B can indicate are: (1) switch is on; (2) power supplied is sufficient; (3) the power switch is on; (4) data is being reproduced; (5) data can be read; (6) data cannot be reproduced and dot codes must be scanned again; (7) switches have been erroneously operated;. (8) codes are meaningless (OK); and (9) data can be read but cannot be reproduced.

Each of the error information display sections 72A and 72B can display nine types of errors, some occurring in the scanning unit 94 and the others occurring in the data-reproducing unit 96. Instead, the error information display section 72A may display only errors which occur in the unit 94, while the error information display section 72B may display errors which occur in the unit 96. Needless to say, the error information display sections 72A and 72B may have means to generate sound to indicate errors occurring in the scanning unit 94 and the data-reproducing unit 96.

This invention has been described based on the embodiments, but this invention is not limited to the above embodiments and can be variously modified without departing from the technical scope thereof. The contents of this invention can be summarized as follows.

(1) An information recording medium having a portion in which multimedia information containing at least one of audio information, video information and digital code data is recorded in the form of an optically readable code pattern (10), characterized in that;

restoring means to be applied to the information recording medium, for reading the code pattern and restoring the original multimedia information comprises:

first hierarchical processing means (32, 34, 36) for converting the code pattern thus read into code data as an image, adding information relating to the reading to the code data as first processing information, and outputting the resultant information;

second hierarchical processing means (38, 40, 42, 44, 46) for recognizing the first processing information output from the first hierarchical processing means, processing code data output from the first hierarchical processing means, creating blocks by collecting the code data for each preset unit, and outputting the blocks;

third hierarchical processing means (48, 50, 52, 54, 56, 58) for collecting the blocks output from the second hierarchical processing means, extracting second processing information at least necessary for creating supermacro-blocks of a larger preset unit from the code data of the blocks, recognizing the second processing information, creating supermacro-blocks based on the second processing information, extracting third information for effecting the error processing operation from the supermacro-blocks, recognizing the third processing information, effecting the error processing operation for the supermacro-blocks based on the third processing information, and outputting subset elements created by distributing the supermacro-blocks based on the third processing information;

fourth hierarchical processing means (60, 62) for extracting fourth processing information at least necessary for creating subsets constructed codes of preset unit which can permit the multimedia information to be restored from the subset elements output from the third hierarchical processing means and outputting subsets created based on the fourth processing information; and fifth hierarchical processing means (66, 74) for extracting fifth processing information ($82_1$, $82_2$, $82_3$, $82_5$, 84) at least necessary for creating reproducing data for reproducing and outputting the multimedia information from the subsets output from the fourth hierarchical processing means and outputting reproducing data of the multimedia information based on the fifth processing information; and characterized in that the code pattern (10) contains at least the second to fifth processing information for executing the application process for adequately selecting and outputting reproducing data from the fifth hierarchical processing means for the respective data types based on the fifth processing information.

That is, in the information recording medium described in Jpn. Pat. Appln. No. 6-121368 (International Application No. PCT/JP95/01050), a file is created based on fifth processing information extracted from the subsets, but in this invention, the fifth hierarchical processing means for outputting reproducing data of multimedia information directly created based on the fifth information also extracted from the subsets and the application process processing means for adequately selecting and outputting the reproducing output section for reproducing and outputting reproducing data based on the fifth processing information are provided so that the file outputting process (creating process) in the above application can be omitted and the processing time up to the reproduction output can be reduced.

(2) An information recording medium according to the information recording medium of the (1), characterized in that the fifth processing information extracted from the subsets output from the fourth hierarchical processing means and at least required for creating reproducing data for reproducing and outputting the multimedia information at least contains type information ($82_{11}a$, $82_{21}a$, $82_{31}a$, $82_{51}a$) indicating the type of reproducing data, position information ($82_{11}d$, $82_{11}e$, $82_{21}d$, $82_{21}e$, $82_{31}d$, $82_{31}e$, $82_{51}d$, $82_{51}e$) indicating the position in which corresponding reproducing data is present, and parameter information ($82_{11}c$, $82_{21}c$, $82_{31}c$, $82_{51}c$) for creating parameters of the hardware necessary for the reproducing process.

That is, since parameters defining the content of the process and the function of the hardware can be directly read not only in a case wherein information can be transferred to the next process (application) in the file data form as in a computer but also in a case of hardware which does not require the file form as in a dedicated reproducing device, the processes of file formation and reading of the processing content can be omitted and high-speed reproduction can be attained.

(3) An information recording medium according to the information recording medium of the (1), characterized in that the fifth processing information extracted from the subsets output from the fourth hierarchical processing means and at least required for creating reproducing data for reproducing and outputting the multimedia information at least contains representative information (84B) capable of collectively defining information of types of reproducing data, information indicating the position in which corresponding reproducing data lies, and parameter information for setting respective parameters of the hardware necessary for the reproducing process.

That is, since representative information capable of collectively defining the type of reproducing data, position information indicating the position in which corresponding reproducing data lies, and parameter information for setting respective parameters of the hardware necessary for the reproducing process is provided, a parameter set corresponding to the representative information can be selected from the parameter set group previously held in the hardware side simply by reading the representative information without reading the parameters one by one from the code information, thereby making it possible to reduce time for the parameter setting operation.

(4) An information recording medium according to the information recording medium of the (1) or (3), characterized in that the fifth processing information extracted from the subsets output from the fourth hierarchical processing means and at least required for creating reproducing data for reproducing and outputting the multimedia information contains only representative information (84A, 84D, 84E) capable of collectively defining the type of reproducing data, position information indicating the position of corresponding reproducing data, and parameter information for setting respective parameters of the hardware necessary for the reproducing process.

That is, since the type of reproducing data, position information indicating the position of corresponding reproducing data, and parameter information for setting respective parameters of the hardware necessary for the reproducing process can be omitted from the code data, a reproducing data (user data) area can be increased accordingly (the redundancy is reduced and if the amount of user data is kept unchanged, the size of the code itself can be reduced).

(5) An information reproducing device for optically reading a code pattern from an information recording medium having a portion in which multimedia information containing at least one of audio information, video information and digital code data is recorded in the form of an optically readable code pattern (10) and restoring the original multimedia information, characterized by comprising:

first hierarchical processing means (32, 34, 36) for converting the code pattern thus read into code data as an image, adding information relating to the reading as first processing information to the code data and then outputting the same;

second hierarchical processing means (38, 40, 42, 44, 46) for recognizing first processing information output from the first hierarchical processing means to process code data output from the first hierarchical processing means, creating blocks by collecting the code data for each preset unit, and outputting the blocks;

third hierarchical processing means (48, 50, 52, 54, 56, 58) for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting the error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means (60, 62) for extracting fourth processing information at least necessary for creating subsets constructed by codes of a preset unit which permits the multimedia information to be restored by use of the subset elements output from the third hierarchical processing means from the subset element and outputting subsets created based on the fourth processing information;

fifth hierarchical processing means (66, 74) for extracting fifth processing information at least necessary for creating reproducing data for reproducing and outputting the multimedia information from the subsets output from the fourth hierarchical processing means and outputting reproducing data of the multimedia information based on the fifth processing information; and application process means (66, 76) for adequately selecting and outputting reproducing data from the fifth hierarchical processing means for the respective data types based on the fifth processing information.

That is, in the information reproducing device described in Jpn. Pat. Appln. No. 6-121368 (International Application No. PCT/JP95/01050), a file is created based on fifth processing information extracted from the subsets, but in this invention, the fifth hierarchical processing means for outputting reproducing data of multimedia information directly created based on the fifth information also extracted from the subsets and the application process processing means for adequately selecting and outputting the reproducing output section for reproducing and outputting reproducing data based on the fifth processing information are provided so that the file outputting process (creating process) in the above application can be omitted and the processing time up to the reproduction output can be reduced.

(6) An information reproducing device according to the information reproducing device of the (5), characterized in that the fifth hierarchical processing means includes:

extracting means (68) for extracting the fifth processing information at least necessary for creating, reproducing and outputting reproducing data for reproducing and outputting the multimedia information from the subsets output from the fourth hierarchical processing means; and means (68), based on the fifth processing information extracted by the extracting means, for determining whether a reproducing hardware is applicable or not, recognizing the type of reproducing data recorded for each preset unit, extracting position information indicating the position of corresponding reproducing data, and parameter information for setting respective parameters of the hardware necessary for the reproducing process, switching (selecting) a processing section, and setting parameters for the hardware.

That is, since parameters defining the content of the process and the function of the hardware can be directly read not only in a case wherein information can be transferred to the next process (application) in the file data form as in a computer but also in a case of hardware which does not require the file form as in a dedicated reproducing device and the parameters are set, the processes of file formation, reading of the processing content and extraction of parameters from the file header can be omitted and high-speed reproduction can be attained.

(7) An information reproducing device according to the information reproducing device of the (5), characterized in that the fifth hierarchical processing means includes:

extracting means (68A) for extracting representative information capable of collectively defining information of types of reproducing data, position information indicating the position of corresponding reproducing data, and parameter information for setting respective parameters of the hardware necessary for the reproducing process among the fifth processing information at least necessary for creating, reproducing and outputting reproducing data for reproducing and outputting the multimedia information from the subsets output from the fourth hierarchical processing means; and means (68), based on the representative information extracted by the extracting means, for determining whether a reproducing hardware is applicable or not, recognizing the type of reproducing data recorded for each preset unit, recognizing and determining position information indicating the position of corresponding reproducing data and parameter information for setting respective parameters of the hardware necessary for the reproducing process, and selecting and setting a corresponding parameter group from the parameter groups containing switching (selection) parameters of a previously prepared processing section for the hardware.

That is, since representative information capable of collectively defining the type of reproducing data, position information indicating the position of corresponding reproducing data, and parameter information for setting respective parameters of the hardware necessary for the reproducing process is provided, a parameter set corresponding to the representative information can be selected from the parameter set group previously held in the hardware side simply by reading the representative information without reading the parameters one by one from the code information, thereby making it possible to reduce time for the parameter setting operation.

(8) An information reproducing device for optically reading a code pattern from an information recording medium having a portion in which multimedia information containing at least one of audio information, video information and digital code data is recorded in the form of an optically readable code pattern (10) and restoring the original multimedia information, characterized by comprising:

first hierarchical processing means (32, 34, 36) for converting the code pattern thus read into code data as an image, adding information relating to the reading as first processing information to the code data, and then outputting the same;

second hierarchical processing means (38, 40, 42, 44, 46) for recognizing first processing information output from the first hierarchical processing means to process code data output from the first hierarchical processing means, creating blocks by collecting the code data for each preset unit, and outputting the blocks;

third hierarchical processing means (48, 50, 52, 54, 56, 58) for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting the error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means (60, 62) for extracting fourth processing information at least necessary for creating subsets constructed by codes of a preset unit which permits the multimedia information to be restored by use of the subset elements output from the third hierarchical processing means from the subset element and outputting subsets created based on the fourth processing information;

fifth hierarchical processing means (66, 74) for extracting fifth processing information at least necessary for creating reproducing data for reproducing and outputting the multimedia information from the subsets output from the fourth hierarchical processing means and outputting reproducing data of the multimedia information based on the fifth processing information; and application process means (66, 76) for adequately selecting and outputting reproducing data from the fifth hierarchical processing means for the respective data types based on the fifth processing information; and characterized in that the fifth hierarchical processing means includes error alarming means (70, 72) for effecting the error alarming process according to the fifth processing information.

That is, whether or not the device is applicable to the format type of user data recorded on the code (dot code) and/or whether or not the device is applicable to the reproducing process of user data is determined, and if the device is not applicable, an error alarm is issued, and if data is not yet reproduced and output, whether data is still being processed or cannot be reproduced can be informed to the user (operator). That is, the user interface can be improved.

(9) An information reproducing device according to the information reproducing device of the (8), characterized in that the fifth hierarchical processing means compares the fifth processing information with information of a processing group which the fifth hierarchical processing means previously holds and to which the fifth hierarchical processing means is applicable and the error informing means informs an error at least when the information reproducing device is not applicable to reproduction of code information.

That is, whether or not the device is applicable to the format type of user data recorded on the code (dot code) and/or whether or not the device is applicable to the reproducing process of user data is determined, and if the device is not applicable, an error alarm is issued, and therefore, even if data is not reproduced, a problem that the user (operator) will misunderstand that the scanning operation is erroneously effected and effect the scanning operation again can be prevented.

(10) An information reproducing device according to the information reproducing device of the (8), characterized in that the error informing means informs an error issued when data is created in the first to fourth hierarchical processing means.

That is, since occurrence of scanning error can be informed to the user (operator) when data cannot be reproduced, the operator can immediately start the scanning operation again.

(11) An information reproducing device according to one of the information reproducing devices of the (8) to (10), characterized in that at least the first hierarchical processing means (100) and at least the hierarchical processing means (104) other than the first hierarchical processing means separately effect the error informing operations in response to occurrence of respective errors.

That is, since the content of error can be obtained by the minimum necessary operation at necessary timings, the information reproducing device can be efficiently used. That is, the operability can be enhanced and kind provision of information to the user can be attained.

(12) An information reproducing device according to the information reproducing device of the (11), characterized in that error information in at least the first hierarchical processing means contains information of reading error (scanning error), erroneous operation of switches, power deficiency (including a case of disconnection).

That is, since the content of error can be obtained by the minimum necessary operation at necessary timings, the information reproducing device can be efficiently used. That is, the operability can be enhanced and kind provision of information to the user can be attained. Further, by providing an alarm display for displaying the above content at least on the scanning section having the first hierarchical processing means, it becomes possible to get information at the time of scanning, during the scanning or immediately after the scanning operation, thereby making it possible to efficiently start the next operation (such as re-scanning).

(13) An information reproducing device characterized by comprising:

scanning means (94) for optically reading a code pattern from an information recording medium having a portion in which multimedia information containing at least one of audio information, video information and digital code data is recorded in the form of an optically readable code pattern (10);

restoring means (96) for restoring the code pattern read by the scanning means into original multimedia information; and error informing means (70, 72) for informing occurrence of error when the original multimedia information cannot be restored by the restoring means while determining whether the cause of non-reproduction is caused by an error occurring in the processing process by the scanning means or restoring means or by the fact that the information reproducing device is not applicable to the code pattern read by the scanning means.

That is, when data is not reproduced, information indicating that the cause is due to the scanning error or due to the fact that the device is not applicable for reproduction of the code data can be given to the user (operator), and therefore, the operator can rapidly determine the next operation (for example, operator may re-scan, operator must give up because the data cannot be reproduced by the device, operator may re-scan with much attention given to the switch because the switching operation has been erroneously effected by the operator, operator must replace the battery because no power is supplied, or the like).

(14) An information reproducing device according to one of the information reproducing devices of the (8) to (10) and (13), characterized in that the error informing means includes at least one of a voice message, electronic sound, mechanical sound, synthesized sound and message character display alarm lamp (color RED, color lamp or the like) or a combination of two or more among them (such as a combination of a plurality of alarm lamps of different colors, a combination of a plurality of messages, a combination of plural types of electronic sounds, mechanical sounds and synthesized sounds).

That is, the more concretely specified error information or information used as criterion for determining the next operation can be given to the operator. Particularly, provision of information indicating the scanning error or non-applicable device is important.

(15) An information reproducing device according to the information reproducing device of the (13), characterized in that the scanning means and the restoring means are separately constructed;

the error informing means includes:

means (72A) provided on the scanning means, for issuing information corresponding to the scanning error by the scanning means and an error caused in the processing process; and means (72B) provided on the restoring means, got issuing information corresponding to an error caused in the restoring process by the restoring means.

That is, since the content of error can be obtained by the minimum necessary operation at necessary timings, the information reproducing device can be efficiently used. That is, the operability can be enhanced and kind provision of information to the user can be attained.

(16) An information reproducing device according to the information reproducing device of the (15), characterized in that information of error in the scanning means is based on the scanning error, operation error of switches or the like, and deficiency of power supply (including a case of disconnection).

That is, since the content of error can be obtained by the minimum necessary operation at necessary timings, the information reproducing device can be efficiently used. That is, the operability can be enhanced and kind provision of information to the user (operator) can be attained. Further, by providing an alarm display for displaying the above content at least on the scanning section having the first hierarchical processing means, it becomes possible to get information at the time of scanning, during the scanning or immediately after the scanning operation, thereby making it possible to efficiently start the next operation (such as re-scanning).

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium having a portion in which multimedia information containing at least one of audio information, video information and digital code data is recorded in the form of an optically readable code pattern, the information recording medium being applied to restoring means for reading the code pattern and restoring the original multimedia information, the restoring means comprising:

first hierarchical processing means for converting the code pattern thus read into code data as an image, adding information relating to the reading to the code data as first processing information, and outputting the resultant information;

second hierarchical processing means for recognizing the first processing information output from the first hierarchical processing means, processing code data output from the first hierarchical processing means, creating blocks by collecting the code data for each preset unit, and outputting the blocks;

third hierarchical processing means for collecting the blocks output from the second hierarchical processing means, extracting second processing information at least necessary for creating supermacro-blocks of a larger preset unit from the code data of the blocks, recognizing the second processing information, creating supermacro-blocks based on the second processing information, extracting third information for effecting an error processing operation from the supermacro-blocks, recognizing the third processing information, effecting the error processing operation for the supermacro-blocks based on the third processing information, and outputting subset elements created by distributing the supermacro-blocks based on the third processing information;

fourth hierarchical processing means for extracting fourth processing information at least necessary for creating subsets constructed with codes of preset unit which can permit the multimedia information to be restored from the subset elements output from the third hierarchical processing means and outputting subsets created based on the fourth processing information; and fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information, and wherein the code pattern contains at least the second to fifth processing information for executing an application process for adequately selecting and outputting reproducing data from the fifth hierarchical processing means for respective data types based on the fifth processing information.

2. An information recording medium according to claim 1, wherein the fifth processing information extracted from the subsets output from the fourth hierarchical processing means contains only representative information capable of collectively defining a type of the reproducing data, position information indicating a position of corresponding reproducing data, and parameter information for setting respective parameters of hardware necessary for executing a reproducing process.

3. An information recording medium according to claim 1, wherein the fifth processing information extracted from the subsets output from the fourth hierarchical processing means at least contains type information indicating a type of the reproducing data, position information indicating a position in which corresponding reproducing data is present, and parameter information for creating parameters of hardware necessary for executing a reproducing process.

4. An information recording medium according to claim 1, wherein the fifth processing information extracted from the subsets output from the fourth hierarchical processing means at least contains representative information capable of collectively defining information of the types of reproducing data, information indicating a position in which corresponding reproducing data lies, and parameter information for setting respective parameters of hardware necessary for executing a reproducing process.

5. An information recording medium according to claim 4, wherein the fifth processing information extracted from the subsets output from the fourth hierarchical processing means contains only representative information capable of collectively defining a type of the reproducing data, position information indicating a position of corresponding reproducing data, and parameter information for setting respective parameters of hardware necessary for executing a reproducing process.

6. An information reproducing device for optically reading a code pattern from an information recording medium having a portion in which multimedia information containing at least one of audio information, video information and digital code data is recorded in the form of an optically readable code pattern, and for restoring the original multimedia information, comprising:

first hierarchical processing means for converting the code pattern thus read into code data as an image, adding information relating to the reading as first processing information to the code data and then outputting same;

second hierarchical processing means for recognizing first processing information output from the first hierarchical processing means to process code data output from the first hierarchical processing means, creating blocks by collecting the code data for each preset unit, and outputting the blocks;

third hierarchical processing means for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting an error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means for extracting fourth processing information at least necessary for creating subsets constructed with codes of a preset unit which permit the multimedia information to be restored by use of the subset elements output from the third hierarchical processing means from the subset element and outputting subsets created based on the fourth processing information;

fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information; and application process means for adequately selecting and outputting reproducing data from the fifth hierarchical processing means for respective data types based on the fifth processing information.

7. An information reproducing device according to claim 6, wherein the fifth hierarchical processing means includes:

extracting means for extracting the fifth processing information at least necessary for creating, reproducing and outputting reproducing data for reproducing and outputting the multimedia information from the subsets output from the fourth hierarchical processing means; and means, based on the fifth processing information extracted by the extracting means, for determining whether a reproducing hardware is applicable or not, recognizing a type of reproducing data recorded for each preset unit, extracting position information indicating a position of corresponding reproducing data, and parameter information for setting respective parameters of hardware necessary for executing a reproducing process, switching a processing section, and setting parameters for the hardware.

8. An information reproducing device according to claim 6, wherein the fifth hierarchical processing means includes:

extracting means for extracting representative information capable of collectively defining information of types of reproducing data, position information indicating a position of corresponding reproducing data, and parameter information for setting respective parameters of hardware necessary for executing a reproducing process among the fifth processing information at least necessary for creating, reproducing and outputting reproducing data for reproducing and outputting the multimedia information from the subsets output from the fourth hierarchical processing means; and means, based on the representative information extracted by the extracting means, for determining whether a reproducing hardware is applicable or not, recognizing a type of reproducing data recorded for each preset unit, recognizing and determining position information indicating a position of corresponding reproducing data and parameter information for setting respective parameters of the hardware necessary for the reproducing process, and selecting and setting a corresponding parameter group from parameter groups containing switching parameters of a previously prepared processing section for the hardware.

9. An information reproducing device for optically reading a code pattern from an information recording medium having a portion in which multimedia information containing at least one of audio information, video information and digital code data is recorded in the form of an optically readable code pattern and for restoring the original multimedia information, comprising:

first hierarchical processing means for converting the code pattern thus read into code data as an image, adding information relating to the reading as first processing information to the code data, and then outputting same;

second hierarchical processing means for recognizing first processing information output from the first hierarchical processing means to process code data output from the first hierarchical processing means, creating blocks by collecting the code data for each preset unit, and outputting the blocks;

third hierarchical processing means for extracting second processing information at least necessary for creating supermacro-blocks of a larger preset unit by collecting the blocks output from the second hierarchical processing means from the code data of the blocks, recognizing the thus extracted second processing information, creating supermacro-blocks based on the second processing information, extracting third processing information for effecting an error processing operation from the supermacro-block, recognizing the thus extracted third processing information, effecting the error processing operation for the supermacro-block based on the third processing information, and outputting subset elements created by distributing the supermacro-blocks based on the third processing information;

fourth hierarchical processing means for extracting fourth processing information at least necessary for creating subsets constructed with codes of a preset unit which permit the multimedia information to be restored by use of the subset elements output from the third hierarchical processing means from the subset element and outputting subsets created based on the fourth processing information;

fifth hierarchical processing means for extracting fifth processing information at least necessary for creating reproducing data for reproducing and outputting the multimedia information from the subsets output from the fourth hierarchical processing means and outputting reproducing data of the multimedia information based on the fifth processing information; and application process means for adequately selecting and outputting reproducing data from the fifth hierarchical processing means for respective data types based on the fifth processing information, and wherein the fifth hierarchical processing means includes error alarming means for effecting an error notification process according to the fifth processing information.

10. An information reproducing device according to claim 9, wherein at least the first hierarchical processing means and at least one hierarchical processing means other than the first hierarchical processing means separately effect the error notification process in response to an occurrence of respective errors.

11. An information reproducing device according to claim 10, wherein error information in at least the first hierarchical processing means contains information relating to reading error, and erroneous operation of switches, power deficiency.

12. An information reproducing device according to claim 9, wherein the error notification process comprises at least one of a voice message, electronic sound, mechanical sound, synthesized sound and message character display alarm lamp.

13. An information reproducing device according to claim 9, wherein the fifth hierarchical processing means compares the fifth processing information with information of a processing group which the fifth hierarchical processing means previously holds and to which the fifth hierarchical processing means is applicable and the error notification process is executed at least when the information reproducing device is not applicable to reproduction of code information.

14. An information reproducing device according to claim 13, wherein at least the first hierarchical processing means and at least one hierarchical processing means other than the first hierarchical processing means separately effect the error notification process in response to an occurrence of respective errors.

15. An information reproducing device according to claim 14, wherein information in at least the first hierarchical processing means contains information relating to reading error, and erroneous operation of switches, power deficiency.

16. An information reproducing device according to claim 13, wherein the error notification process comprises at least one of a voice message, electronic sound, mechanical sound, synthesized sound and message character display alarm lamp.

17. An information reproducing device according to claim 9, wherein the error notification process is executed when data is created in the first to fourth hierarchical processing means.

18. An information reproducing device according to claim 17, wherein at least the first hierarchical processing means and at least one hierarchical processing means other than the first hierarchical notification process in response to an occurrence of respective errors.

19. An information reproducing device according to claim 18, wherein error information in at least the first hierarchical processing means contains information relating to reading error, erroneous operation of switches, and power deficiency.

20. An information reproducing device according to claim 17, wherein the error notification process comprises at least one of a voice message, electronic sound, mechanical sound, synthesized sound and message character display alarm lamp.

* * * * *